(12) United States Patent
Miyabayashi et al.

(10) Patent No.: US 11,317,343 B2
(45) Date of Patent: Apr. 26, 2022

(54) INFORMATION PROCESSING DEVICE, INFORMATION PROCESSING METHOD, AND INFORMATION PROCESSING SYSTEM FOR CONTROLLED TRANSMISSION OF CONTENT

(75) Inventors: Naoki Miyabayashi, Tokyo (JP); Yasuharu Ishikawa, Kanagawa (JP); Kazuo Takada, Chiba (JP); Tomoyuki Nakayama, Tokyo (JP); Takayuki Inamori, Tokyo (JP); Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1064 days.

(21) Appl. No.: 12/930,384

(22) Filed: Jan. 5, 2011

(65) Prior Publication Data
US 2011/0173125 A1 Jul. 14, 2011

(30) Foreign Application Priority Data
Jan. 13, 2010 (JP) .............................. JP2010-004540

(51) Int. Cl.
| | |
|---|---|
| *H04W 48/18* | (2009.01) |
| *G06Q 20/12* | (2012.01) |
| *G06Q 30/06* | (2012.01) |
| *G06Q 20/32* | (2012.01) |
| *H04W 88/06* | (2009.01) |
| *H04W 12/04* | (2021.01) |
| *H04W 4/00* | (2018.01) |
| *G06Q 20/38* | (2012.01) |
| *H04W 12/033* | (2021.01) |

(52) U.S. Cl.
CPC ............ *H04W 48/18* (2013.01); *G06Q 20/12* (2013.01); *G06Q 20/1235* (2013.01); *G06Q 20/32* (2013.01); *G06Q 20/322* (2013.01); *G06Q 20/3829* (2013.01); *G06Q 30/06* (2013.01); *H04W 12/033* (2021.01); *H04L 2463/101* (2013.01); *H04W 4/00* (2013.01); *H04W 12/04* (2013.01); *H04W 88/06* (2013.01)

(58) Field of Classification Search
None
See application file for complete search history.

(56) References Cited

U.S. PATENT DOCUMENTS 5,968,175 A * 10/1999 Morishita et al. .............. 726/28
6,209,787 B1 * 4/2001 Iida ................................ 235/381
(Continued)

FOREIGN PATENT DOCUMENTS

JP 2008-252806 A 10/2008

*Primary Examiner* — John W Hayes
*Assistant Examiner* — Zehra Raza
(74) *Attorney, Agent, or Firm* — Chip Law Group

(57) ABSTRACT

An information processing device includes: an exchange unit configured to exchange information concerning a communication state with, respect to a server using a first communication with another information processing device which becomes the other party of communication in a second communication; and a method selection unit configured to select a transmission/reception method of content data with respect to another information processing device using the second communication based on the information exchanged by the exchange unit in accordance with the communication state of each device with respect to the server using the first communication.

4 Claims, 27 Drawing Sheets

(56) References Cited

U.S. PATENT DOCUMENTS

| | | | | |
|---|---|---|---|---|
| 6,311,214 | B1* | 10/2001 | Rhoads | 709/217 |
| 6,523,113 | B1* | 2/2003 | Wehrenberg | 713/176 |
| 6,973,458 | B1* | 12/2005 | Maeda et al. | |
| 7,454,457 | B1* | 11/2008 | Lowery et al. | 709/203 |
| 8,036,598 | B1* | 10/2011 | Zhu | H04L 12/5865 |
| | | | | 455/41.1 |
| 2001/0010045 | A1* | 7/2001 | Stefik et al. | 705/51 |
| 2001/0023417 | A1* | 9/2001 | Stefik et al. | 705/57 |
| 2002/0077984 | A1* | 6/2002 | Ireton | 705/51 |
| 2011/0126009 | A1* | 5/2011 | Camp, Jr. | H04L 9/0825 |
| | | | | 713/168 |

* cited by examiner

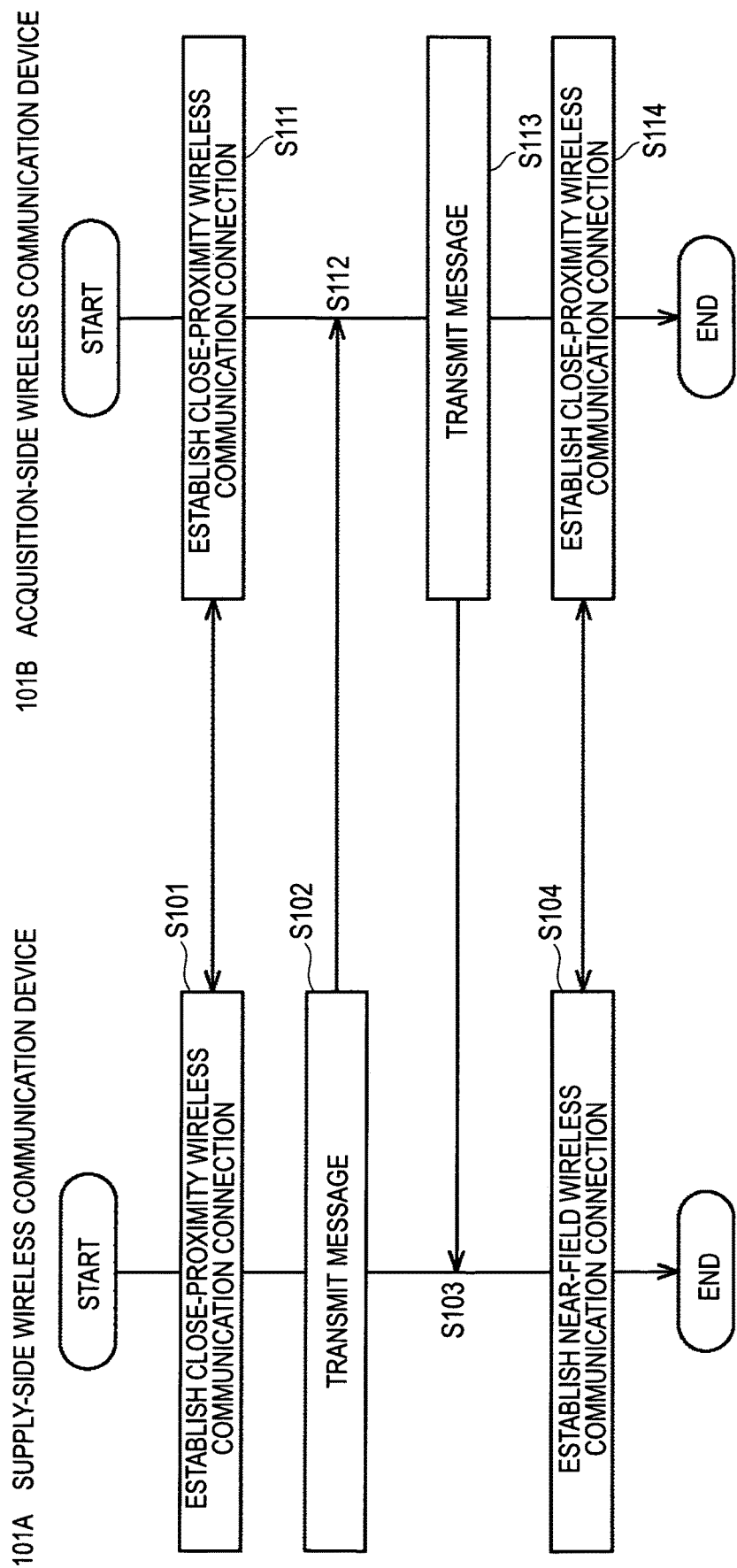

FIG.10

| DISTRIBUTION METHOD | NECESSITY OF CONNECTION TO MOBILE COMMUNICATION NETWORK | |
|---|---|---|
| | SUPPLY SIDE | ACQUISITION SIDE |
| TRANSMIT CONTENTS BEFORE PAYMENT (CASE 1) | NECESSARY (ARBITRARY TIMING) ※1 | NECESSARY (ARBITRARY TIMING) ※1 |
| TRANSMIT CONTENTS AFTER PAYMENT (CASE 2) | NECESSARY | NECESSARY |
| TRANSMIT CONTENTS AFTER PAYMENT (CASE 3) | UNNECESSARY | NECESSARY |
| TRANSMIT CONTENTS AFTER PAYMENT (CASE 4) | NECESSARY | UNNECESSARY |

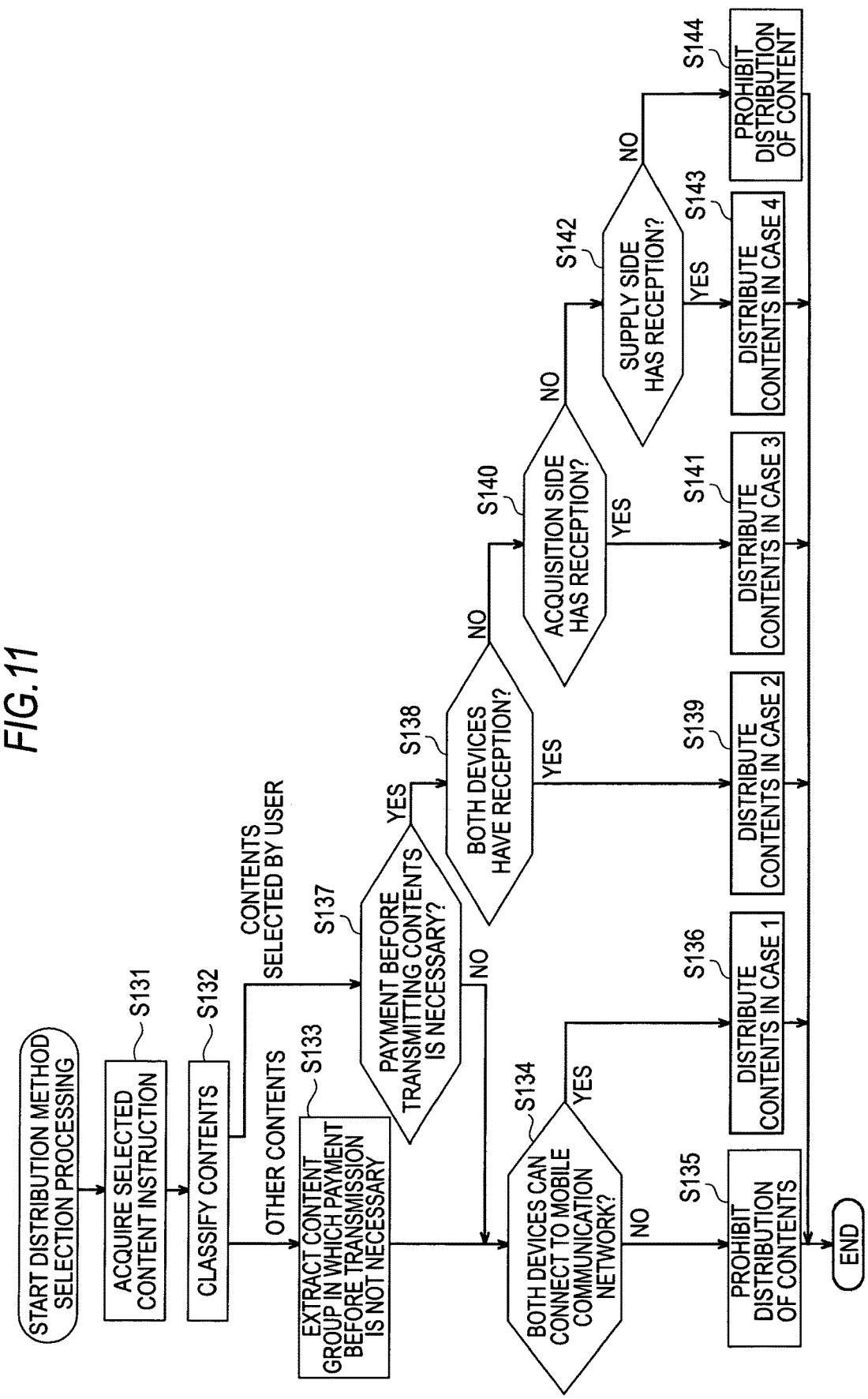

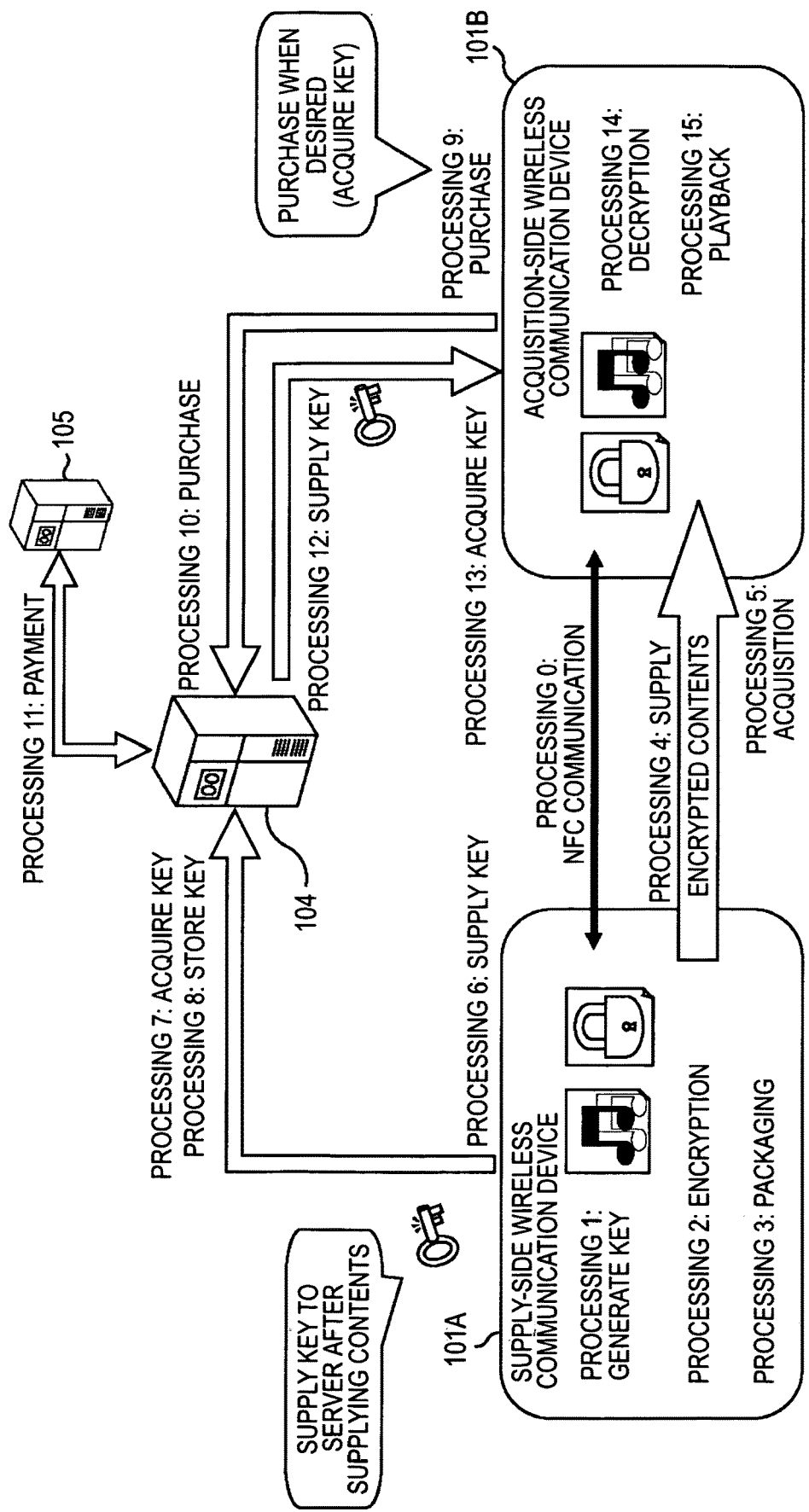

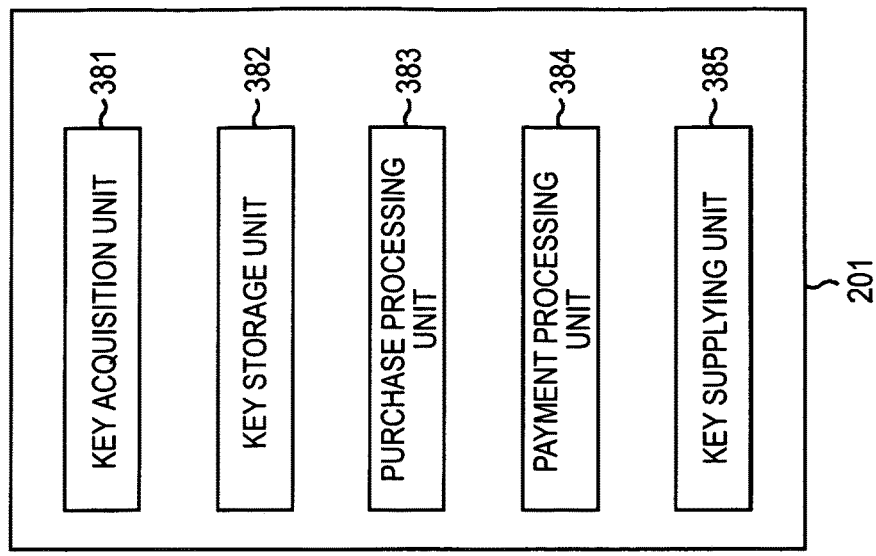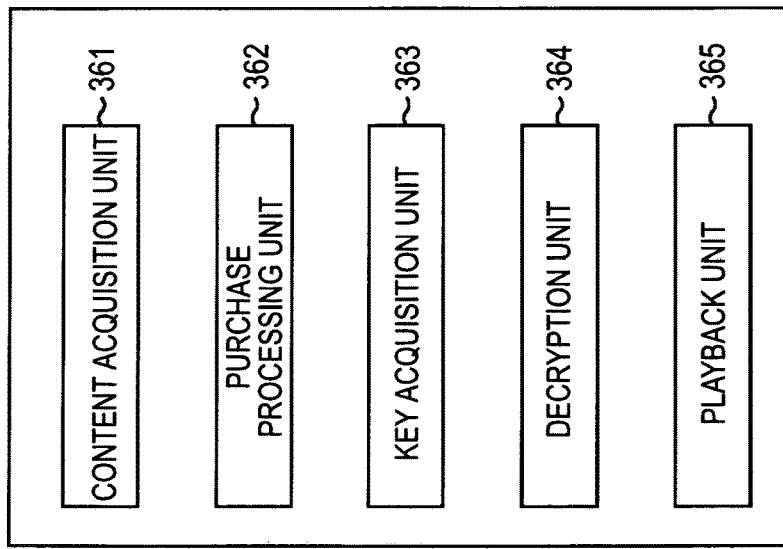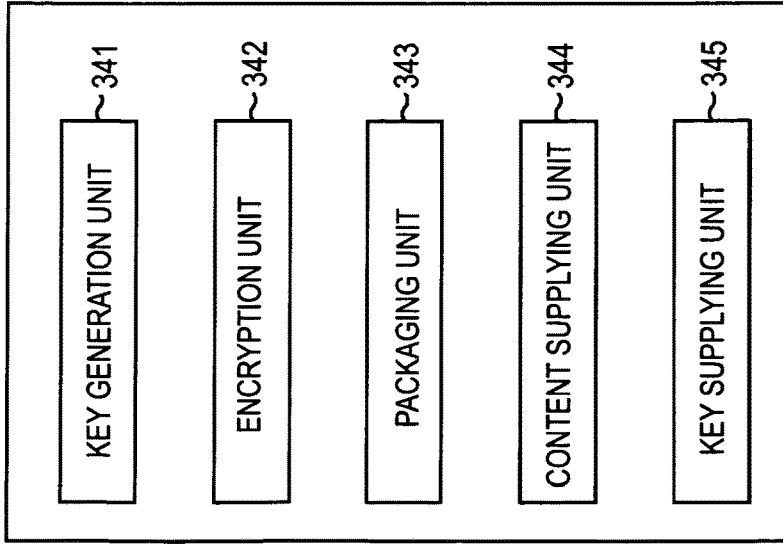

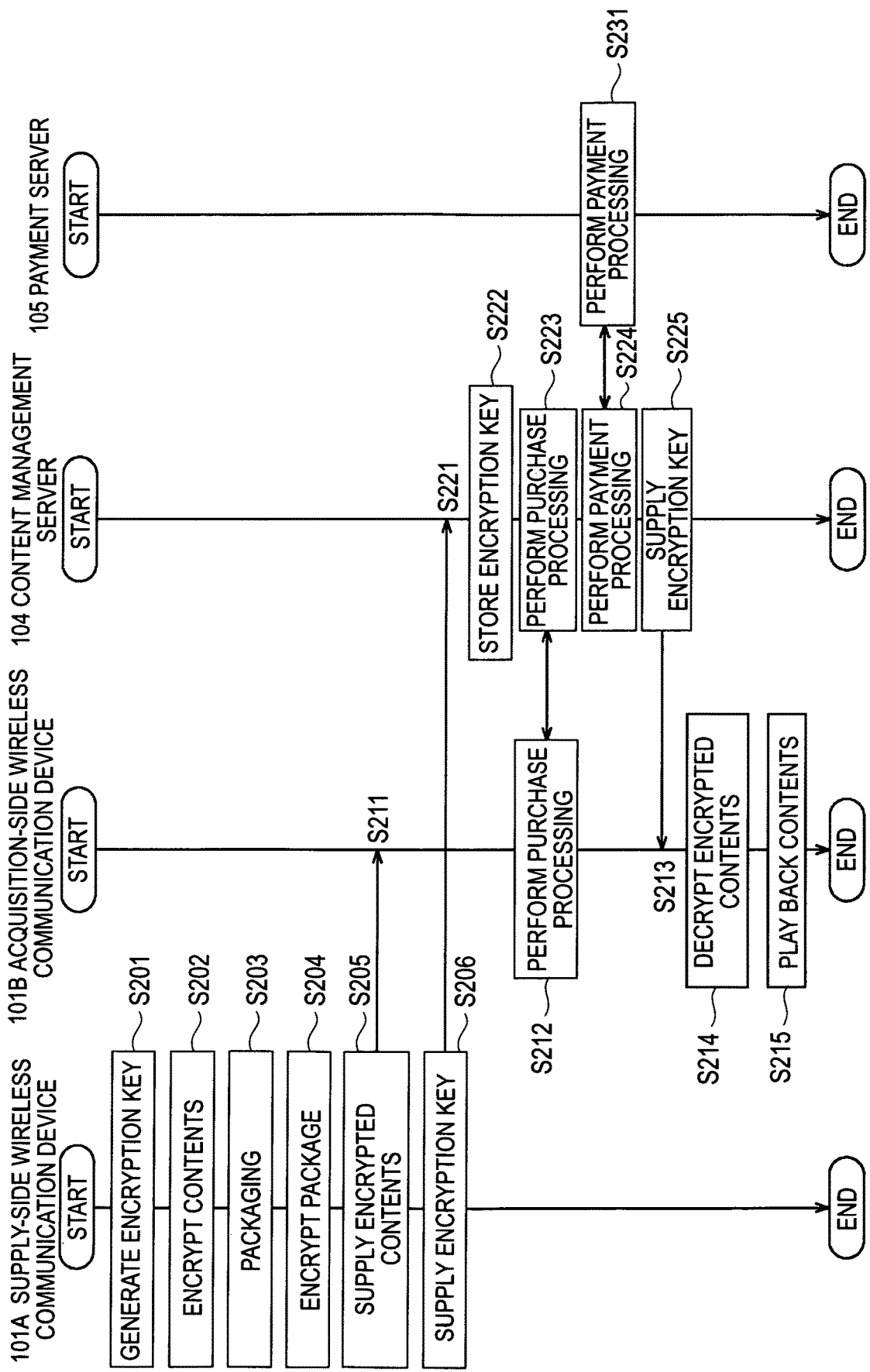

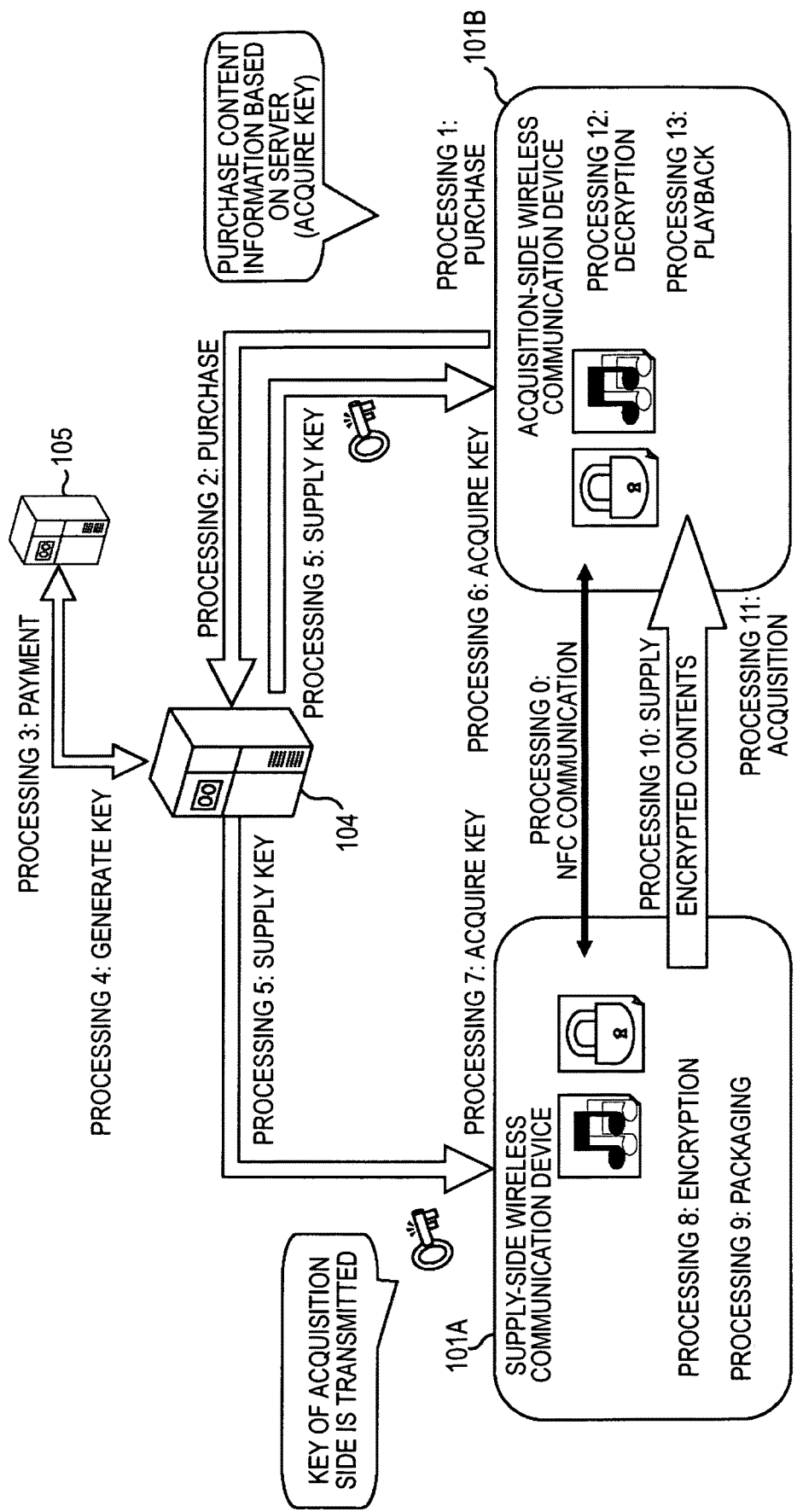

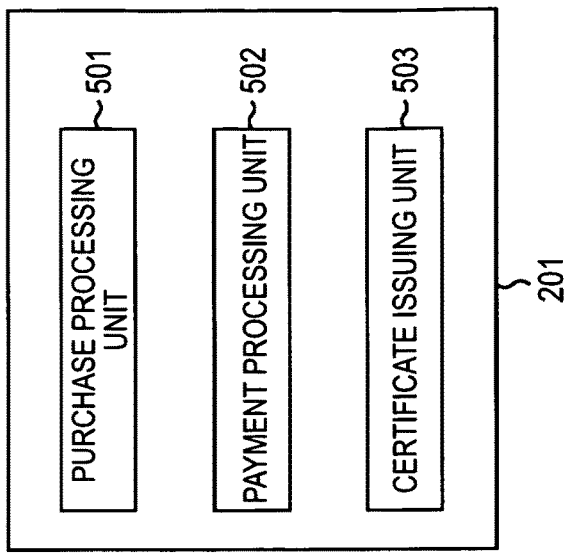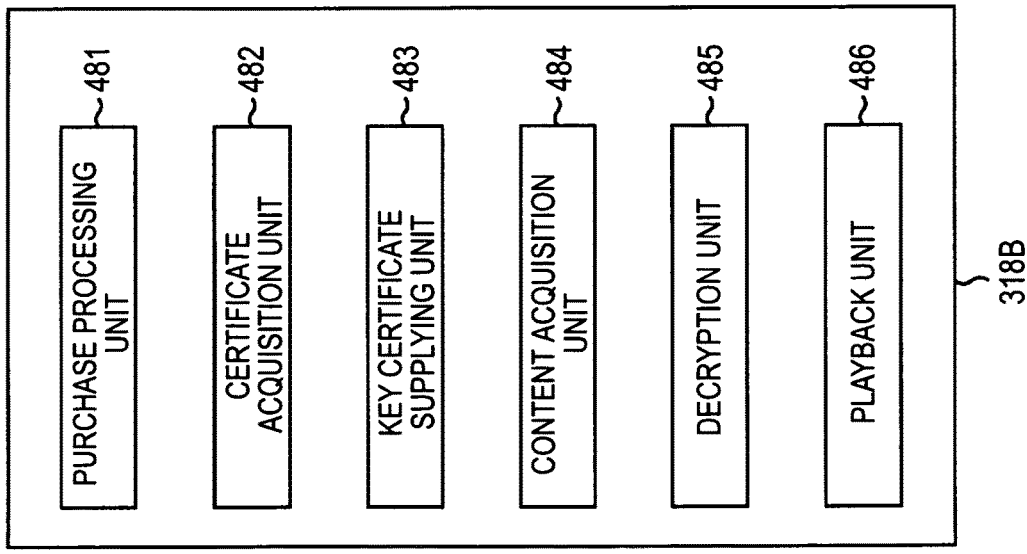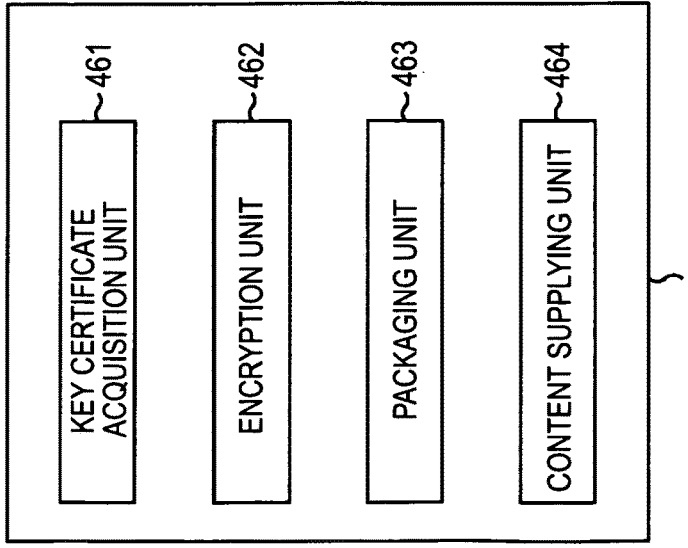

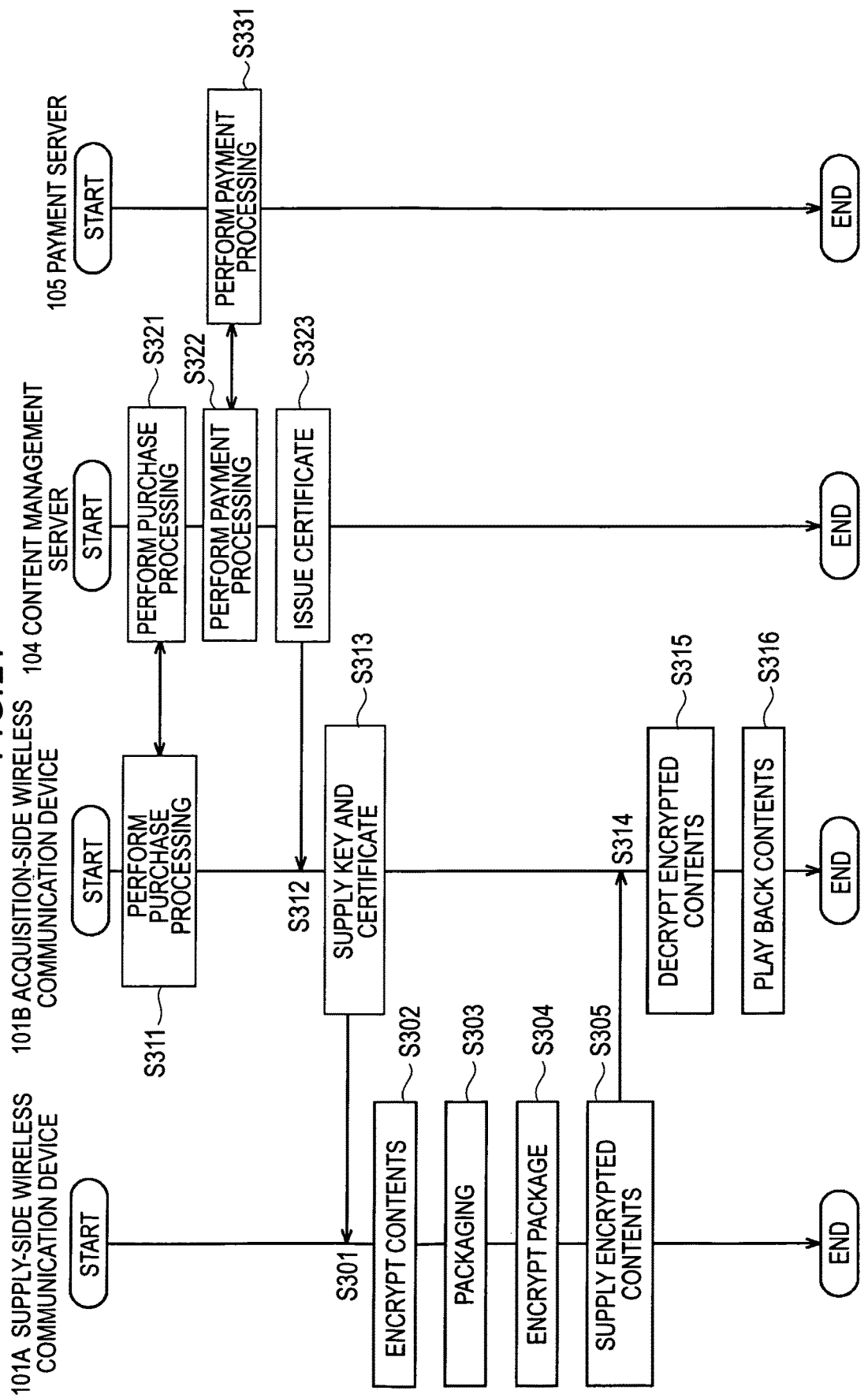

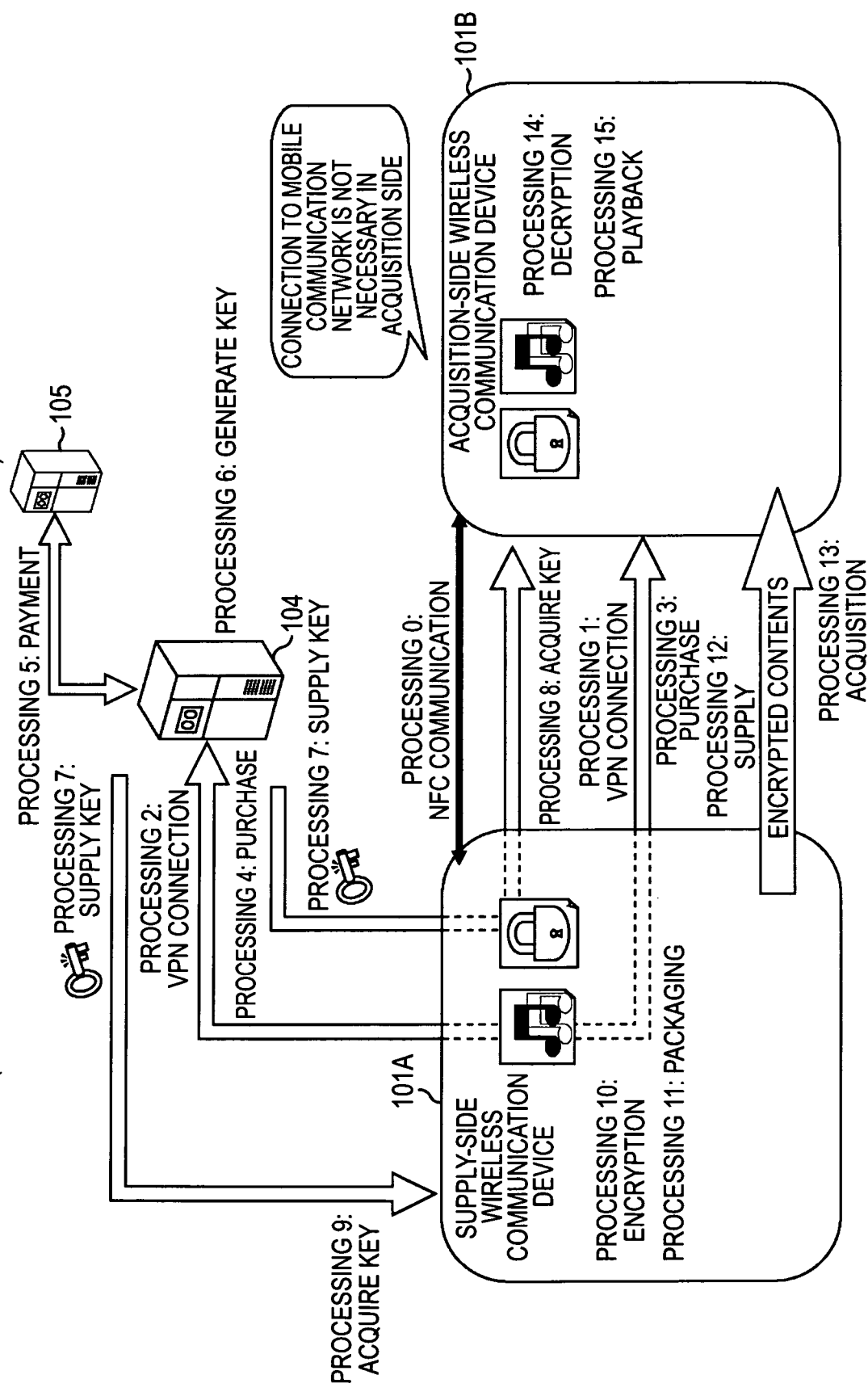

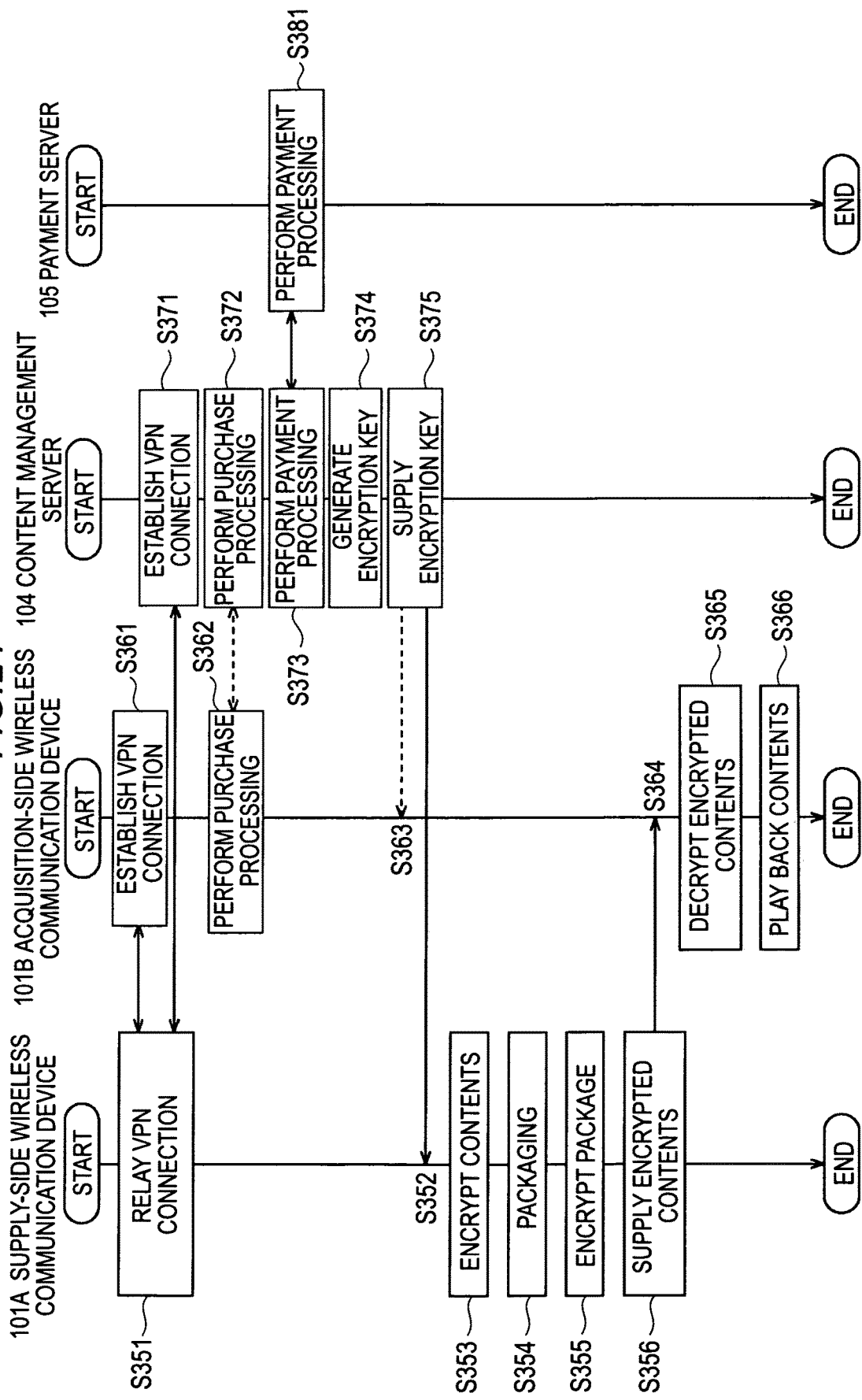

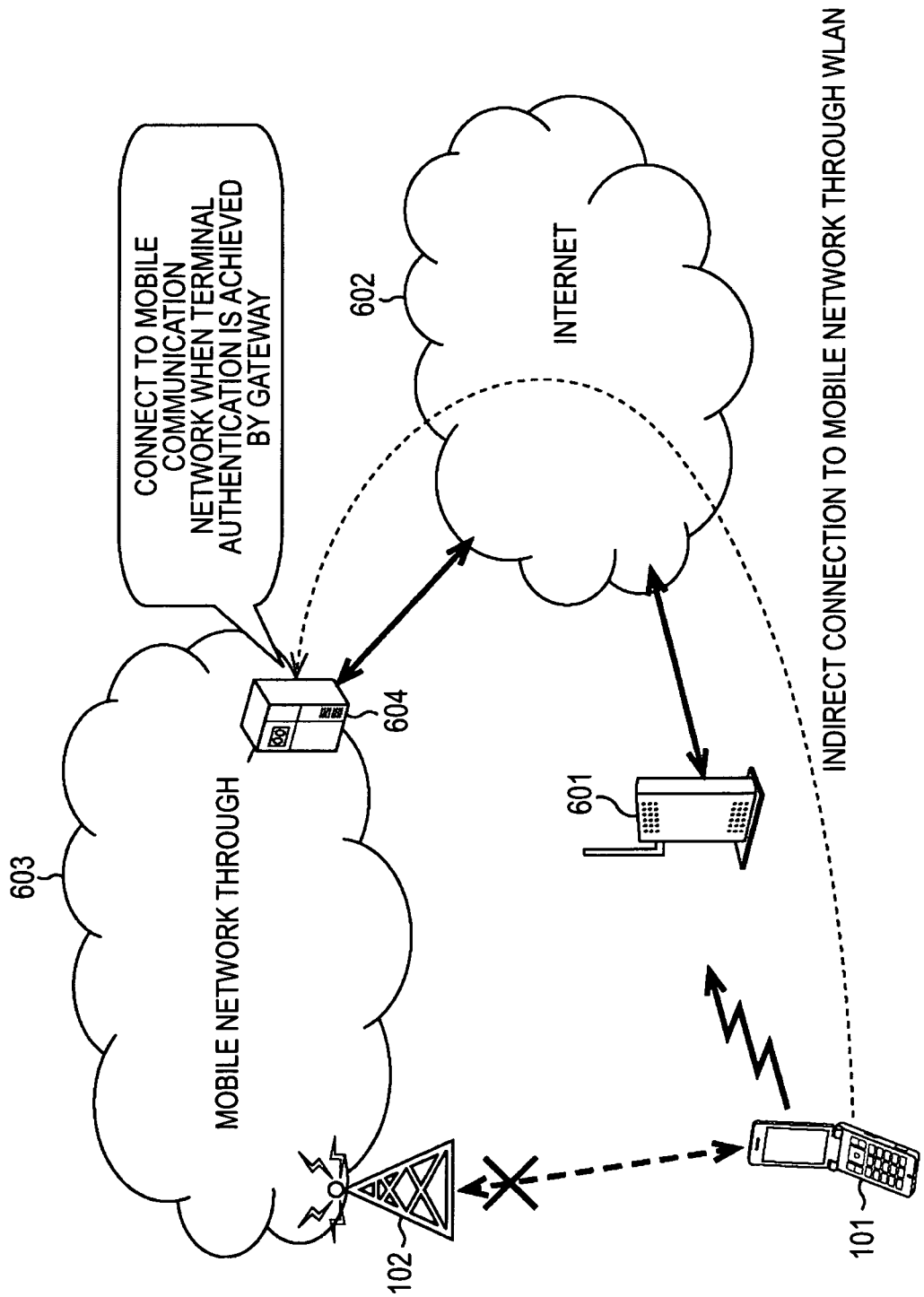

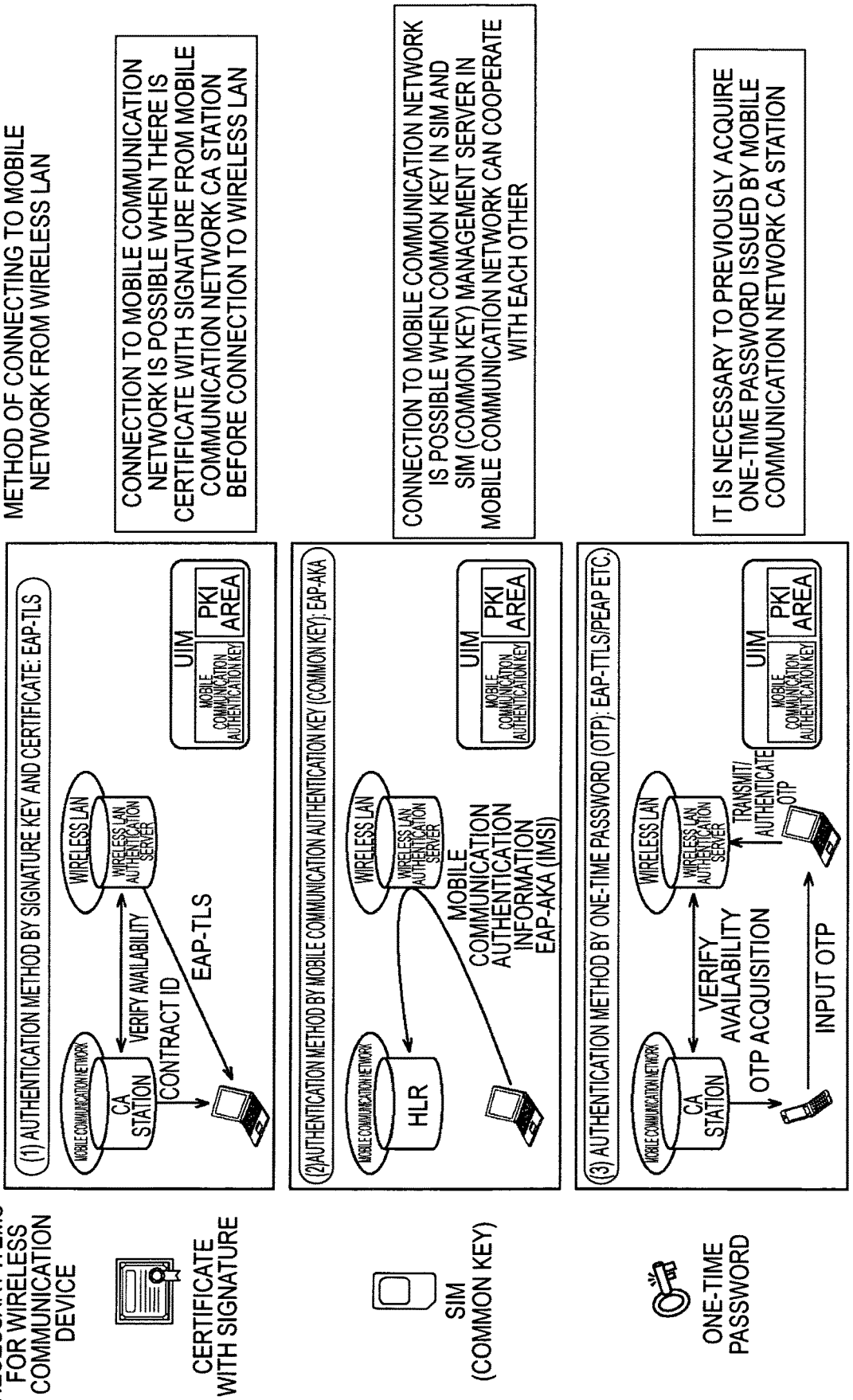

INFORMATION PROCESSING DEVICE, INFORMATION PROCESSING METHOD, AND INFORMATION PROCESSING SYSTEM FOR CONTROLLED TRANSMISSION OF CONTENT

CROSS-REFERENCE TO RELATED APPLICATION

The present application claims priority from Japanese Patent Application No. JP 2010-004540 filed in the Japanese Patent Office on Jan. 13, 2010, the entire content of which is incorporated herein by reference.

BACKGROUND OF THE INVENTION

1. Field of the Invention

The present invention relates to an information processing device, a method thereof, an information processing system and a method thereof, and particularly relates to an information processing device, a method thereof, an information processing system and a method thereof capable of increasing legitimate distribution opportunity of contents.

2. Description of the Related Art

Up to the present, various contents (music, moving pictures and so on) are provided for a cellular phone device. Generally, when a user purchases contents from a server by operating the cellular phone device and reproduces the contents in such service, the cellular phone device is connected to a content management server through a mobile communication network and performs purchase processing, then, downloads and stores the content data in a local disk to reproduce the data.

As contents are accumulated as described above, the cellular phone device comes to have a function as a content player such as a music player in addition to a phone-call function is originally included, and the importance of the function is increased when the contents are further accumulated. The contents accumulated in the cellular phone are often exposed to the public, and the distribution amount of contents by a so-called "word-of-mouth" effect is actually increasing, in which users of such cellular phone devices meet each other and reputation concerning contents accumulated in the cellular phone devices spreads. Presently, a scheme of distributing the contents propagating by the "word-of-mouth" more efficiently and properly is requested.

There is a case in which the cellular phone device has near-field wireless communication means such as Bluetooth (Trademark) and WiFi (Trademark). In this case, the cellular phone devices can communicate with each other directly (locally). There is also a case in which the cellular phone device has a non-contact communication (NFC (Near Field Communication) device. In this case, users allows their cellular phone devices to be close to (or touch) each other to thereby perform connection authentication by the non-contact communication device, which enables the near field wireless communication (handover).

The users just allows their cellular phone devices to touch each other, thereby exchanging contents accumulated in the cellular phone devices easily by the near-field wireless communication using the above handover function.

That is, the user can get contents easily from the cellular phone devices of neighboring users by local communication without performing complicated operations such that the user makes a connection to a server and searches a desired content to download the content.

When considering a position of a person having copyright (administrator), it is necessary to establish a scheme of receiving values positively while increasing the distribution amount of contents. That is, it is necessary that purchase processing is completed before reproducing the content though the distribution of a content file is permitted.

For example, the users can arbitrarily exchange contents with each other when the contents has no copyright, however, a distribution scheme of performing reasonable processing such as billing is necessary while preventing illegal copy and the like with respect to distribution of copyrighted contents. Generally, as the scheme for preventing illegal distribution (illegal copy) of contents, a system (DRM (Digital Rights Management) including a server managing payment and distribution control of contents as well as managing reproduction authority on a reproduction device and the reproduction device operating in accordance with the reproduction authority has been introduced.

A billing system used when reproducting contents using the cellular phone as described above has been also proposed (for example, refer to JP-A-2008-252806 (Patent Document 1)).

In the case of a method described in Patent Document 1, a reproduction device generates content use information and transmits the information to the server at the time of reproducing contents. The server manages reproduction authority of contents on the reproduction device in accordance with reproduction status and billing status of contents which are sequentially received.

SUMMARY OF THE INVENTION

However, in the method described in Patent Document 1, it is necessary that the content reproduction information is synchronized between the reproduction device and the management server concerning reproduction status, therefore, the method presupposes that the reproduction device (cellular phone device) can communicate with the server.

Accordingly, when a fixed period of reproduction time passes after the device has no reception, reproduction is interrupted. That is, when it is difficult that the reproduction device is continuously connected to the management server, the reproduction device is in danger of failing to reproduction the content continuously.

Thus, it is desirable to realize content distribution under more various conditions and to increase legitimate distribution opportunity of contents to thereby allow users to enjoy contents more easily.

According to an embodiment of the invention, there is provided an information processing device including an exchange unit configured to exchange information concerning a communication state with respect to a server using a first communication with another information processing device which becomes the other party of communication in a second communication, and a method selection unit configured to select a transmission/reception method of content data with respect to another information processing device using the second communication based on the information exchanged by the exchange unit in accordance with the communication state of each device with respect to the server using the first communication.

The exchange unit also can exchange information indicating timing at which payment processing concerning acquisition of the content data is performed.

When it is determined that transmission/reception of the content data is possible before the payment processing as well as both the information processing device itself and another information processing device have a function of connecting to the server by using the first communication based on the information exchanged by the exchange unit, the method selection unit can select a method in which the information processing device itself generates an encryption key, encrypts the content data before payment processing, transmits the data to another information processing device and registers the encryption key in the server, and another information processing device acquires the encryption key from the server after performing payment processing, and decrypts the encrypted content data.

When it is determined that transmission/reception of the content data is possible before the payment processing as well as both the information processing device itself and another information processing device have a function of connecting to the server by using the first communication based on the information exchanged by the exchange unit, the method selection unit can select a method in which another information processing device generates an encryption key, encrypts the content data before payment processing, transmits the data to another information processing device and registers the encryption key in the server, and the information processing device itself acquires the encryption key from the server after performing payment processing, and decrypts the encrypted content data.

When it is determined that the payment processing is necessary before transmission/reception of the content data as well as both the information processing device itself and another information processing device are capable of connecting to the server by using the first communication based on the information exchanged by the exchange unit, the method selection unit can select a method in which the server generates an encryption key after the payment processing by another information processing device and transmits the generated encryption key to the information processing device itself and the another information processing device, the information processing device itself encrypts the content data by using the encryption key and transmits the data to another information processing device and another information processing device decrypts the encrypted content data by using the encrypted key.

When it is determined that the payment processing is necessary before transmission/reception of the content data as well as both the information processing device itself and another information processing device are capable of connecting to the server by using the first communication based on the information exchanged by the exchange unit, the method selection unit can select a method in which the server generates an encryption key after the payment processing by the information processing device itself and transmits the generated encryption key to the information processing device itself and the another information processing device, another information processing device encrypts the content data by using the encryption key and transmits the data to the information processing device itself and the information processing device itself decrypts the encrypted content data by using the encrypted key.

When it is determined that the payment processing is necessary before transmission/reception of the content data as well as only another information processing device is capable of connecting to the server by using the first communication based on the information exchanged by the exchange unit, the method selection unit can select a method in which the server issues a certificate after the payment processing by another information processing device, another information processing device transmits the certificate and a public key to the information processing device itself, the information processing device itself encrypts the content data by using the public key and transmits the data to another information processing device and another information processing device decrypts the encrypted content data by using a secret key corresponding to the public key.

When it is determined that the payment processing is necessary before transmission/reception of the content data as well as only the information processing device itself is capable of connecting to the server by using the first communication based on the information exchanged by the exchange unit, the method selection unit can select a method in which the server issues a certificate after the payment processing by the information processing device itself, the information processing device itself transmits the certificate and a public key to another information processing device, another information processing device encrypts the content data by using the public key and transmits the data to the information processing device itself and the information processing device itself decrypts the encrypted content data by using a secret key corresponding to the public key.

When it is determined that the payment processing is necessary before transmission/reception of the content data as well as only the information processing device itself is capable of connecting to the server by using the first communication based on the information exchanged by the exchange unit, the method selection unit can select a method in which another information processing device and the server establish encrypted connection through the information processing device itself, the server generates an encryption key after the payment processing through the encrypted communication by another information processing device and transmits the encryption key to the information processing device itself and another information processing device, the information processing device itself encrypts the content data by using the encryption key and transmits the data to another information processing device and another information processing device decrypts the encrypted content data by using the encryption key.

When it is determined that the payment processing is necessary before transmission/reception of the content data as well as only another information processing device is capable of connecting to the server by using the first communication based on the information exchanged by the exchange unit, the method selection unit can select a method in which the information processing device itself and the server establish encrypted connection through another information processing device, the server generates an encryption key after the payment processing through the encrypted communication by the information processing device itself and transmits the encryption key to another information processing device and the information processing device itself, another information processing device encrypts the content data by using the encryption key and transmits the data to the information processing device itself and the information processing device itself decrypts the encrypted content data by using the encryption key.

When it is determined that another information processing device is capable of connecting to the server by using the first communication based on the information exchanged by the exchange unit, the method selection unit can select a method in which the server transmits information concerning a key to another information processing device; another information processing device transmits the information concerning the key to the information processing device itself, the information processing device itself encrypts the content data by using the information concerning the key and transmits the data to another information processing device, and another information processing device decrypts the content data by using the information concerning the key.

When it is determined that the information processing device itself is capable of connecting to the server by using the first communication based on the information exchanged by the exchange unit, the method selection unit can select a method in which the server transmits information concerning a key to the information processing device itself, the information processing device itself transmits the information concerning the key to another information processing device, another information processing device encrypts the content data by using the information concerning the key and transmits the data to the information processing device itself, and the information processing device itself decrypts the content data by using the information concerning the key.

When it is determined that another information processing device is capable of connecting to the server by using the first communication based on the information exchanged by the exchange unit, the method selection unit can select a method in which another information processing device and the server establish connection through the information processing device itself, the server generates an encryption key and transmits the generated encryption key to the information processing device itself and another information processing device, the information processing device itself encrypts the content data by using the encryption key and transmits the data to another information processing device, and another information processing device decrypts the encrypted content data by using the encryption key.

When it is determined that the information processing device itself is capable of connecting to the server by using the first communication based on the information exchanged by the exchange unit, the method selection unit can select a method in which the information processing device itself and the server establish connection through another information processing device, the server generates an encryption key and transmits the generated encryption key to another information processing device and the information processing device itself, another information processing device encrypts the content data by using the encryption key and transmits the data to the information processing device itself, and the information processing device itself decrypts the encrypted content data by using the encryption key.

According to another embodiment of the invention, there is provided an information processing method of an information processing device including the steps of exchanging information concerning a communication state with respect to a server using a first communication with another information processing device which becomes the other party of communication in a second communication by an exchange unit of the information processing device and selecting a transmission method of content data to another information processing device using the second communication based on the information exchanged by the exchange unit in accordance with the communication state of each device with respect to the server using the first communication by a method selection unit of the information processing device.

According to still another embodiment of the invention, there is provided an information processing system including a first information processing device transmitting the contents, a second information processing device receiving contents and a server managing transmission/reception of the contents, in which the first information processing device has a first exchange unit configured to exchange information concerning a communication state with respect to the server using a first communication with the second information processing device which becomes the other party of communication in a second communication and a first method selection unit configured to select a transmission/reception method of content data with respect to the second information processing device using the second communication based on the information exchanged by the first exchange unit in accordance with the communication state of each device with respect to the server using the first communication, in which the second information processing device has a second exchange unit configured to exchange information concerning the communication state with respect to the server using the first communication with the first information processing device and a second method selection unit configured to select the transmission/reception method of content data with respect to the first information processing device using the second communication based on the information exchanged by the second exchange unit in accordance with the communication state of each device with respect to the server using the first communication.

According to yet another embodiment of the invention, there is provided a an information processing method of an information processing system having a first information processing device transmitting contents, a second information processing device receiving the contents and a server managing transmission/reception of the contents, which includes the steps of exchanging information concerning a communication state with respect to the server using a first communication with the second information processing device which becomes the other party of communication in a second communication by a first exchange unit of the first information processing device, selecting a transmission/reception method of content data with respect to the second information processing device using the second communication based on the exchanged information in accordance with the communication state of each device with respect to the server using the first communication by a first method selection unit of the first information processing device, exchanging information concerning the communication state with respect to the server using the first communication with the first information processing device by a second exchange unit of the second information processing device and selecting the transmission/reception method of content data with respect to the first information processing device using the second communication based on the exchanged information in accordance with the communication state of each device with respect to the server using the first communication by a second method selection unit of the second information processing device.

According to the embodiments of the invention, information concerning the communication state with respect to the server using the first communication is exchanged with another information processing device which is the other party of communication in the second communication, and the transmission method of content data with respect to another information processing device using the second communication is selected in accordance with the communication state of each device with respect to the server using the first communication.

According to the embodiments of the invention, information concerning the communication state with respect to the server using the first communication with the second information processing device which is the other party of communication in the second communication, the transmission/reception method of content data with respect to the second information processing device using the second communication is selected based on the exchanged information in accordance with the communication state of each device with respect to the server using the first communication, information concerning the communication state with respect to the server using the first communication is exchanged with the first information processing device using the second communication and the transmission/reception method of content data with respect to the first information processing device using the second communication is selected in accordance with the communication state of each device with respect to the server using the first communication.

According to the embodiments of the invention, contents can be distributed. Particularly, it is possible to increase legitimate distribution opportunity of contents under more various conditions.

BRIEF DESCRIPTION OF THE DRAWINGS

FIG. 9 is a flowchart for explaining an example of the flow of handover processing;

FIG. 10 is a table explaining operation conditions of the content distribution methods;

FIG. 11 is a flowchart for explaining an example of distribution method selection processing;

FIG. 13 is a view for explaining an example of the main flow of a first distribution method;

FIGS. 14A to 14C are functional block diagrams for explaining functional blocks concerning the first distribution method;

FIG. 15 is a flowchart for explaining an example of the main flow of first content distribution processing;

FIG. 16 is a view for explaining an example of the main flow of a second distribution method;

FIG. 20A to 20C are functional block diagrams for explaining functional blocks concerning the third distribution method;

FIG. 21 is a flowchart for explaining an example of the main flow of third content distribution processing;

FIG. 22 is a view for explaining an example of the main flow of a fourth distribution method;

FIG. 24 is a flowchart for explaining an example of the main flow of fourth content distribution processing;

FIG. 25 is a view for explaining another example of mobile communication network connection;

FIG. 26 is a view for explaining other examples of mobile communication network connection.

DESCRIPTION OF THE PREFERRED EMBODIMENTS

Hereinafter, the best mode for carrying out the invention (referred to as an embodiment in the following description) will be explained. The explanation will be made in the following order.

1. First Embodiment (Content distribution system)

1. First Embodiment

Content Distribution System

Figure 1:
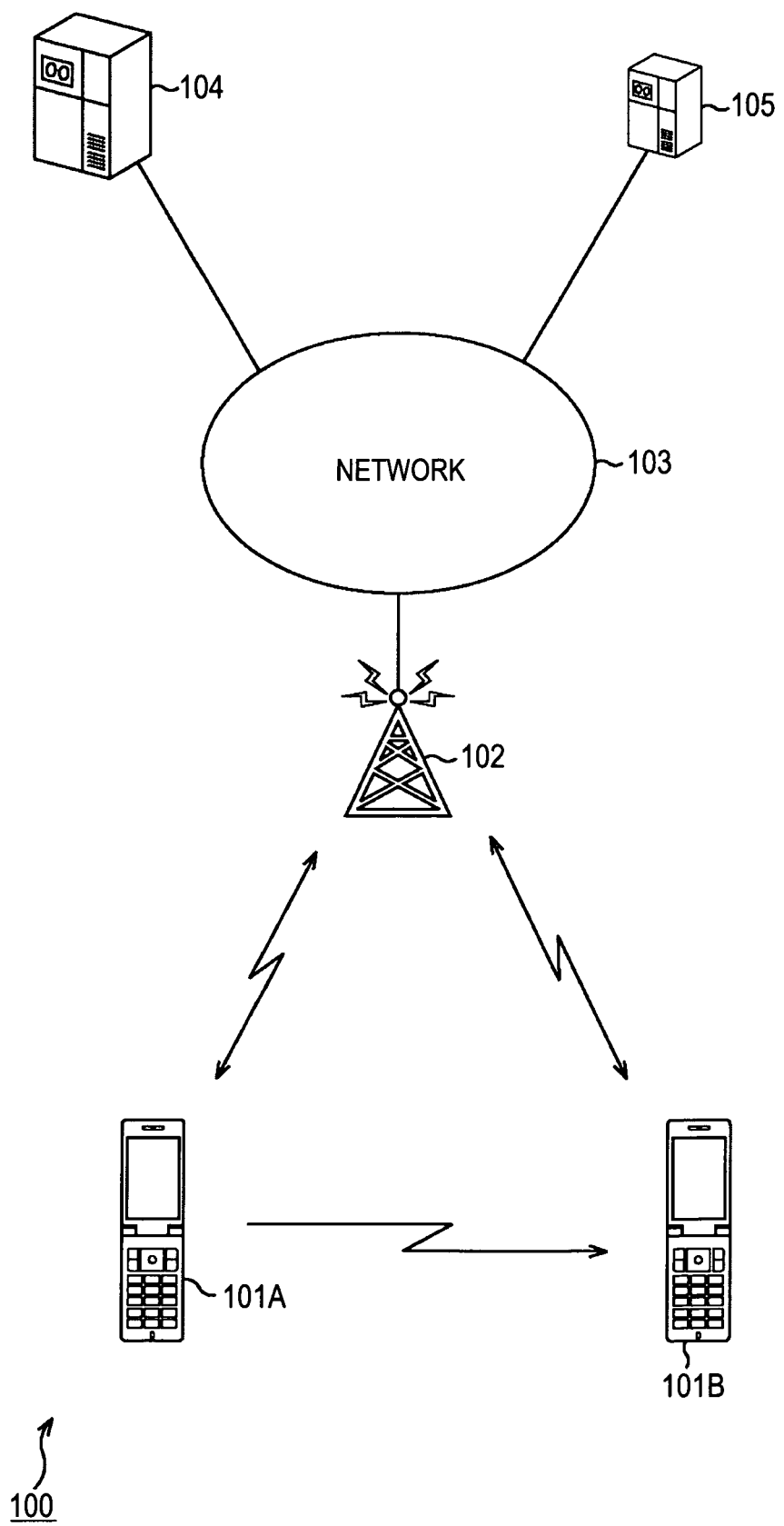
FIG. 1 is a view showing a main configuration example of a content distribution system to which the invention is applied.

FIG. 1 is a view showing a main configuration example of a content distribution system to which the invention is applied.

A content distribution system 100 shown in FIG. 1 is a system of distributing data of contents (content data) of images, audio and so on used at terminals.

In FIG. 1, both a supply-side wireless communication device 101A and an acquisition-side wireless communication device 101B operate as terminals of the content distribution system 100. When it is not necessary to distinguish the devices on explanation, they are referred to simply as a wireless communication device 101.

The wireless communication device 101 is an information processing device having later-described given wireless communication functions such as a cellular phone device, a smart phone, a PDA, a netbook or a notebook personal computer. The wireless communication device 101 can perform local (narrowband) wireless communication (near field wireless communication or close proximity wireless communication) with another wireless communication device 101 positioned at a short distance or in proximity to the wireless communication device 101 not through a mobile communication network (a wireless base station 102).

At least one of the supply-side wireless communication device 101A and the acquisition-side wireless communication device 101B can perform communication with another device (for example, another wireless communication device 101 and so on) through the wireless base station 102 of the mobile communication network which is a broadband public circuit network.

For example, the wireless communication device 101 can acquire content data such as images and audio from another device by using the above wireless communication functions. The wireless communication device 101 also includes a storage unit, which can store the acquired content data. The wireless communication device 101 also has a reproduction function of the content data, which can display images and can output audio.

For example, the wireless communication device 101 is connected to Internet from the mobile communication network through the wireless base station 102, acquiring (downloading) content data from the server and storing the content data.

The wireless communication device 101 can reproduce and output the content data by itself as well as can supply the content data to another wireless communication device 101 by using local wireless communication such as the near field wireless communication. To give and to receive content data by the local wireless communication between the above terminals (wireless communication devices 101) is called distribution.

In FIG. 1, a case in which the supply-side wireless communication device 101A supplies content data stored in the device itself to the acquisition-side wireless communication device 101B is shown as an example of content distribution.

That is, the supply-side wireless communication device 101A indicates the wireless communication device 101 which supplies content data and the acquisition-side wireless communication device 101B indicates the wireless communication device 101 which acquires the content data.

Naturally, various patterns of distributing contents such that content data possessed by both devices are given and received (exchanged) between them may be actually considered, therefore, a case in which one wireless communication device 101 has both functions of the supply-side wireless communication device 101A and the acquisition-side wireless communication device 101B may be considered.

That is, in the following explanation, the supply-side wireless communication device 101A and the acquisition-side wireless communication device 101B are devices respectively obtained by modeling a function for supplying contents and a function for acquiring contents included in the wireless communication device 101, which do not indicate that each wireless communication device 101 is classified into the supply-side wireless communication device 101A or the acquisition-side wireless communication device 101B.

The mobile communication network including the wireless base station 102 is also connected to external networks such as Internet. A network 103 shown in FIG. 1 includes various communication networks such as the mobile communication network and Internet.

The wireless base station 102 is explained as a device to be an interface with respect to the wireless communication device 101 in the mobile communication network, which does not indicate an individual device. Therefore, the supply-side wireless communication device 101A and the acquisition-side wireless communication device 101B can connect to the mobile communication network through different wireless base stations 102 respectively.

The distribution of contents between the wireless communication devices 101 is managed by a content management server 104 connected to the network 103. Naturally, contents with no copyright and personal contents created by the user and so on can be distributed between the wireless communication devices 101, however, these are not related to the invention, therefore, only the distribution of contents managed by the content management server 104 will be explained below.

The content management server 104 manages giving and receiving of contents performed between the wireless communication devices 101 which are terminals. For example, the content management server 104 performs processing of providing an encryption key, purchasing contents and so on.

In the following description, distribution managed by the content management server 104 is regarded as regular distribution and other distributions are regarded as inappropriate actions.

The wireless communication device 101 distributes contents after encrypting the contents for prohibiting illegal distribution. The content management server 104 manages distribution of contents by performing management of facts of distribution, management of encryption keys, billing processing and so on.

The content management server 104 performs billing processing by using a payment server 105 connecting to the network 103. It is also preferable that the content management server 104 provides contents.

As described above, it is necessary that the distribution of content data in the wireless communication device 101 is managed by making an access to the content management server 104 when giving and receiving content data regularly by the local wireless communication.

In related-art systems, contents can be distributed only in a condition that both the supply-side wireless communication device 101A and the acquisition-side wireless communication device 101B can continuously make accesses to the content management server 104, however, the wireless communication device 101 can select a distribution method of contents in accordance with circumstances such as communication status and communication functions in the case of the content distribution system 100.

Accordingly, there is a case in which contents can be distributed when at least one of the supply-side wireless communication device 101A and the acquisition-side wireless communication device 101B can access to the content management server 104.

That is, the content distribution system 100 can increase legitimate distribution opportunity of contents under more various conditions.

[Configuration of the Wireless Communication Device]

Figure 2:
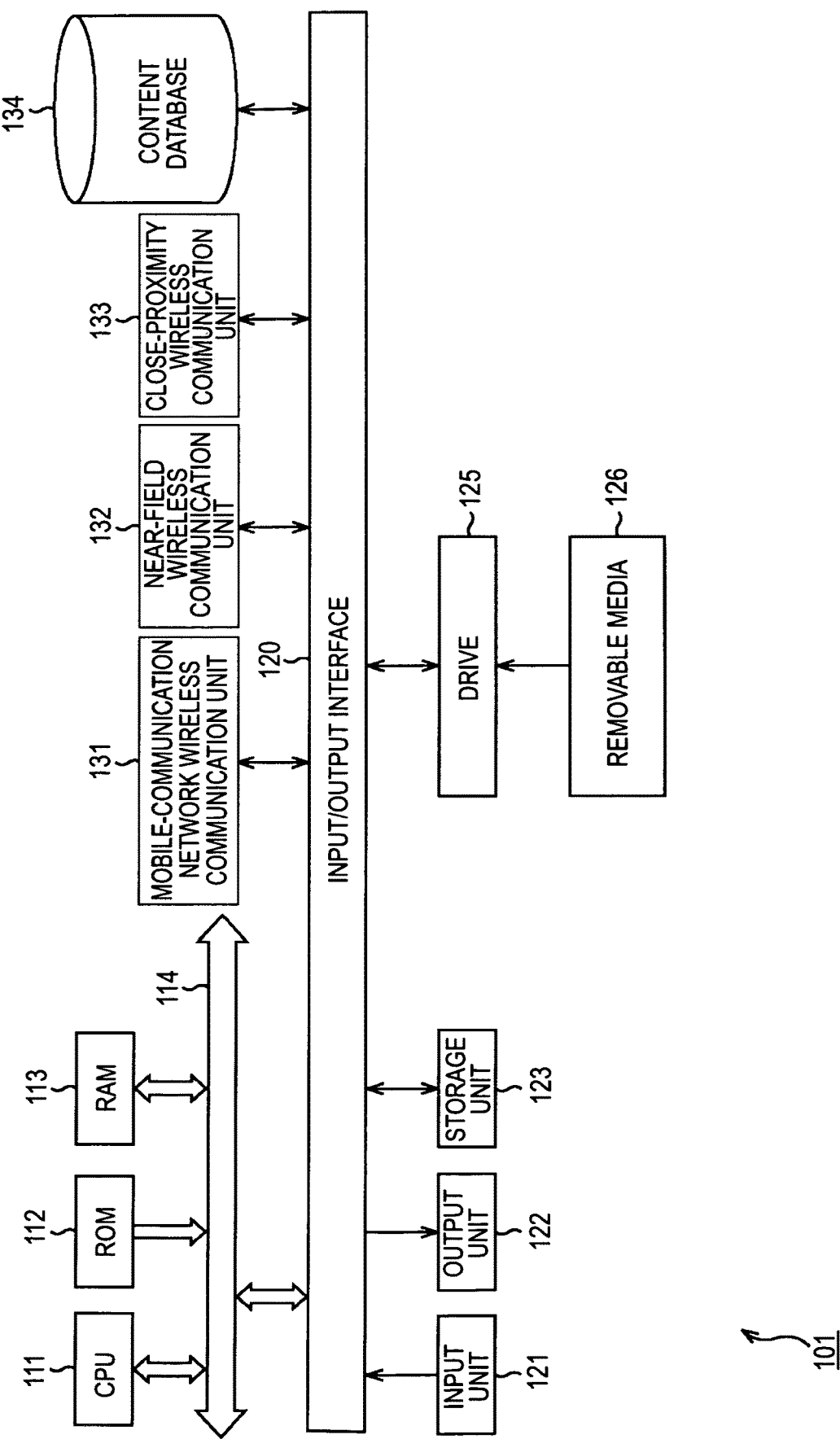
FIG. 2 is a block diagram showing a configuration example of a wireless communication device.

Next, configurations of respective devices will be explained. FIG. 2 is a block diagram showing a configuration example of the wireless communication device.

In FIG. 2, a CPU (Central Processing Unit) 111 of the wireless communication device 101 executes various processing in accordance with programs stored in a ROM (Read Only Memory) 112 or programs loaded from a storage unit 123 to a RAM (Random Access Memory) 113. In the RAM 113, data necessary for executing various processing by the CPU 111 is also stored appropriately.

The CPU 111, the ROM 112 and the RAM 113 are connected to one another through a bus 114. An input/output interface 120 is also connected to the bus 114.

To the input/output interface 120, an input unit 121 including a keyboard, a mouse and the like, an output unit 122 including a display formed by a CRT (Cathode Ray Tube) or an LCD (Liquid Crystal Display), a speaker and the like as well as a storage unit 123 including a hard disk, a flash memory and the like are connected.

A drive 125 is also connected to the input/output interface 120 according to need, on which removal media 126 such as a magnetic disc, an optical disc, a magnet-optic disc and a semiconductor memory are mounted appropriately. Computer program read from these media are installed into the storage unit 123 according to need.

A mobile-communication network wireless communication unit 131, a near-field wireless communication unit 132, a close-proximity wireless communication unit 133 and a content database 134 are further connected to the input/output interface 120.

The mobile-communication network wireless communication unit 131 is a wireless communication device performing wireless communication with the wireless base station 102 to perform communication through the mobile communication network. The mobile-communication network wireless communication unit 131 uses a frequency band of, for example, 2 GHz, and is used not only for a phone call application but also for various communication applications such as connection to Internet using data communication of 2 Mbps at maximum. For example, the wireless communication by the mobile-communication network wireless communication unit 131 is used for download of content data, communication with respect to the content management server 104 and so on.

The near-field wireless communication unit 132 is a near-field wireless communication device for Bluetooth (Trademark) or IEEE (Institute of Electrical and Electronic Engineers) 802.11x. Here, the near field wireless communication indicates a local (narrowband) wireless communication having the maximum communication range of approximately several meters to a few tens of meters. A communication standard is optional. For example, the near-field wireless communication unit 132 performs communication with the maximum communication speed of 3M bit/second (after version 2.0+EDR) in a 2.4 GHz band through an antenna. The near field wireless communication by the near-field wireless communication unit 132 is used for, for example, transmission and reception of content data (distribution of contents).

The close-proximity wireless communication unit 133 is an NFC (Near Field Communication) device. Here, the close proximity wireless communication indicates local (narrowband) wireless communication having the maximum communication range of approximately a few tens of centimeters. The communication standard is optional. For example, the close-proximity wireless communication unit 133 performs communication with a communication rate of 424K bit/second at maximum within an extremely close range of approximately 10 centimeters by using a frequency band of 13.56 MHz through the antenna.

The close proximity wireless communication by the close-proximity wireless communication unit 133 is used for giving and transmitting, to the wireless communication device 101 whose casing is brought into contact or close thereto, information necessary for establishing the near-field wireless communication connection by the near-field wireless communication unit 132 and a message in which a list of distributable contents and so on are written.

The content database 134 is a database which stores and manages content data downloaded from a server or acquired from another wireless communication device 101 by the wireless communication device 101. The content database 134 stores and manages not only content data but also information concerning contents.

Respective processing units of the wireless communication device 101 are controlled by the CPU 111. Execution binary codes of control programs are stored in the ROM 112 and the storage unit 123, and stack and heap areas are created on the RAM 113 for various computing processing.

[Configuration of the Wireless Base Station]

Figure 3:
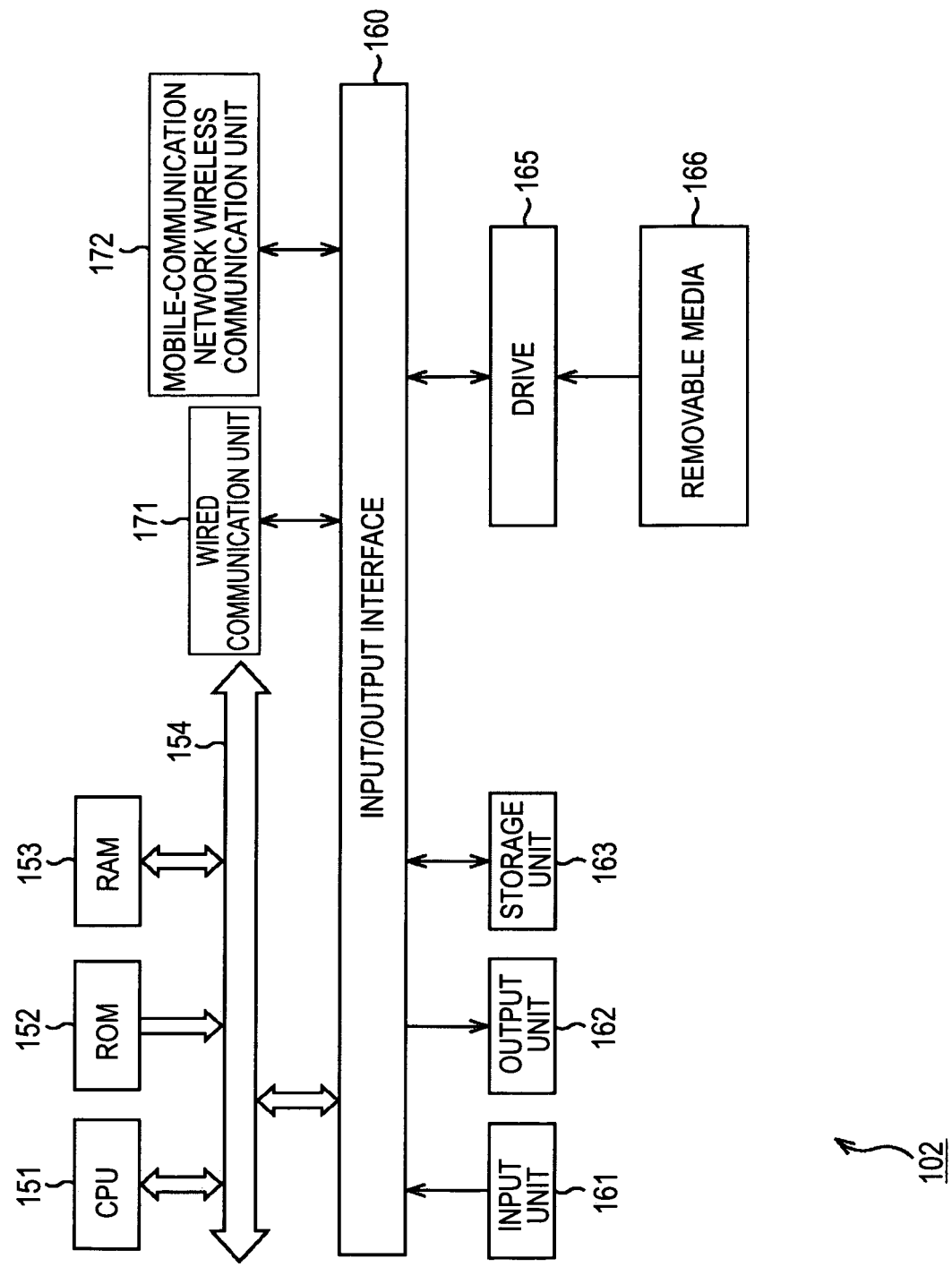
FIG. 3 is a block diagram showing a configuration example of a wireless base station.

FIG. 3 is a block diagram showing a configuration example of the wireless base station.

As shown in FIG. 3, the wireless base station 102 includes a CPU 151, a ROM 152 and a RAM 153 connected to one another through a bus 154 in the same manner as in the case of the wireless communication device 101. An input/output interface 160 is connected to the bus 154.

To the input/output interface 160, an input unit 161, an output unit 162, a storage unit 163 and a drive 165 for removable media 166 are connected in the same manner as in the case of the wireless communication device 101.

The CPU 151, the ROM 152, the RAM 153, the bus 154, the input/output interface 160, the input unit 161, the output unit 162, the storage unit 163, the drive 165 and the removable media 166 of FIG. 3 correspond to the CPU 111, the ROM 112, the RAM 113, the bus 114, the input/output interface 120, the input unit 121, the output unit 122, the storage unit 123, the drive 125 and the removable media 126 of FIG. 2, respectively.

The wireless base station 102 further includes a wired communication unit 171 and a mobile-communication network wireless communication unit 172 which are connected to the input/output interface 160.

The wired communication unit 171 performs communication with other devices through the network 103 including the mobile communication network, Internet and so on. The communication standard is optional. The wired communication unit 171 is used for, for example, communication with respect to the content management server 104 (relay between the wireless communication device 101 and the content management server 104).

The mobile-communication network wireless communication unit 172 corresponds to the mobile-communication network wireless communication unit 131 of FIG. 2 and is used for wireless communication with respect to the wireless communication device 101.

[Configuration of the Content Management Server]

Figure 4:
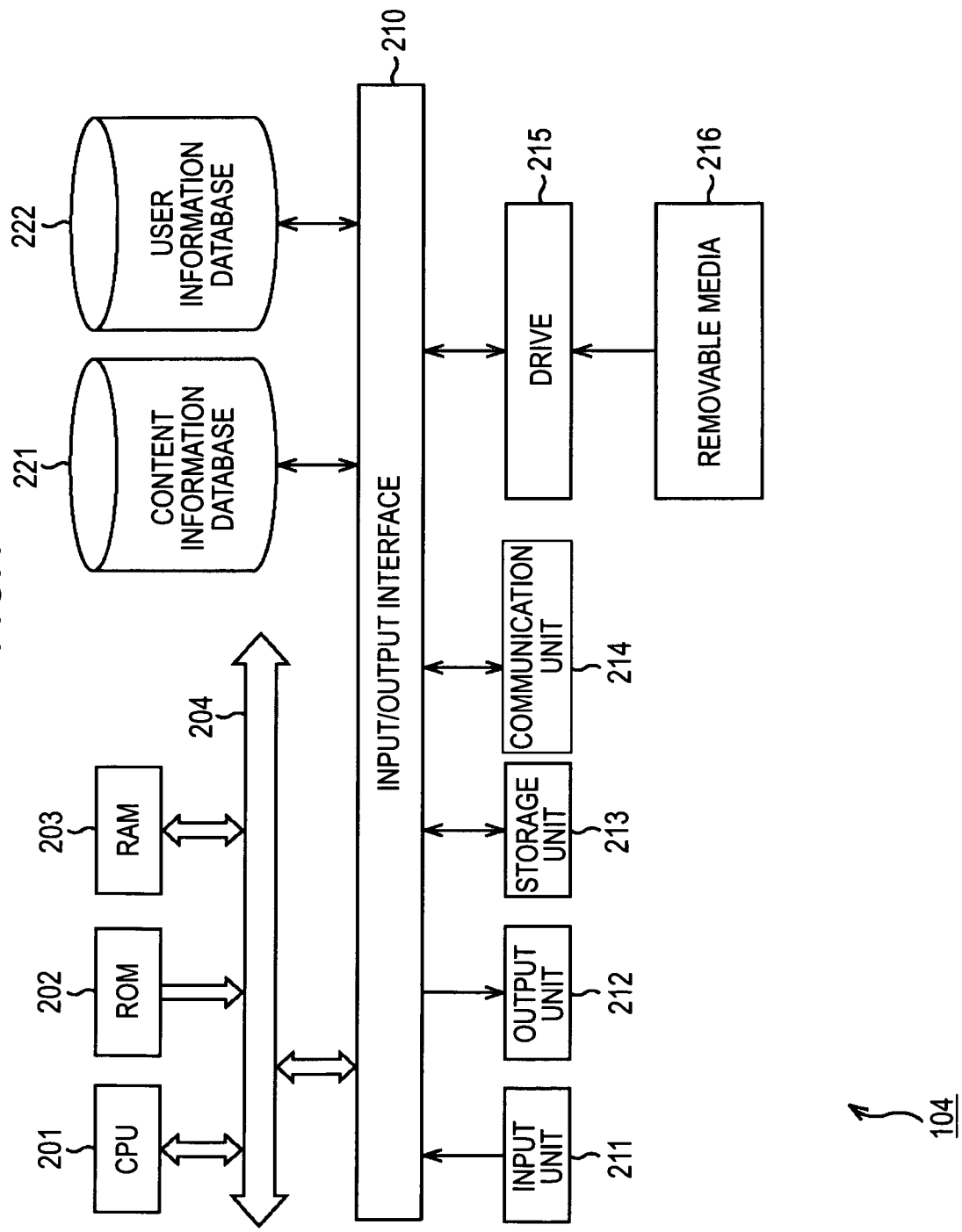
FIG. 4 is a block diagram showing a configuration example of a content management server.

FIG. 4 is a block diagram showing a configuration example of the content management server.

As shown in FIG. 4, the content management server 104 includes a CPU 201, a ROM 202 and a RAM 203 which are connected to one another through a bus 204 in the same manner as in the case of the wireless communication device 101. An input/output interface 210 is connected to the bus 204.

To the input/output interface 210, an input unit 211, an output unit 212, a storage unit 213 and a drive 215 for removable media 216 are connected in the same manner as in the case of the wireless communication device 101.

The CPU 201, the ROM 202, the RAM 203, the bus 204, the input/output interface 210, the input unit 211, the output unit 212, the storage unit 213, the drive 215 and the removable media 216 of FIG. 4 correspond to the CPU 111, the ROM 112, the RAM 113, the bus 114, the input/output interface 120, the input unit 121, the output unit 122, the storage unit 123, the drive 125 and the removable media 126 of FIG. 2, respectively.

The content management server 104 also includes a communication unit 214 connected to the input/output interface 210. The communication unit 214 is a communication device performing communication with other devices through the network 103. For example, the communication unit 214 is used for communication with respect to the wireless communication device 101 and the payment server 105.

A content information database 221 and a user information database 222 are further connected to the input/output interface 210.

The content information database 221 stores and manages information concerning contents distributed between the wireless communication devices 101. The information is used for, for example, management of the encryption key used at the time of distributing content data.

The user information database 222 stores and manages information concerning users who distribute contents. The information is used for, for example, payment processing and so on.

[Configuration of the Payment Server]

Figure 5:
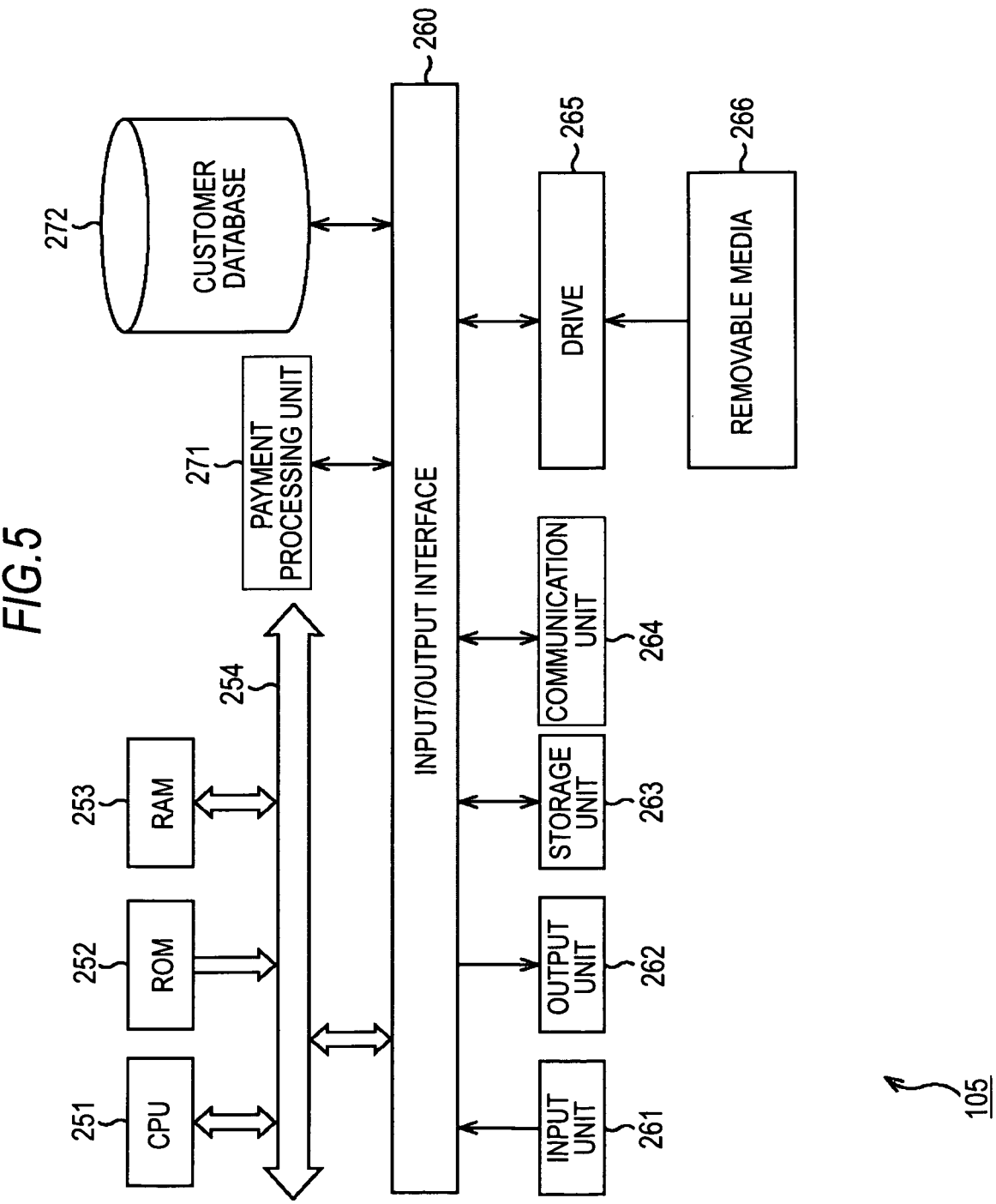
FIG. 5 is a block diagram showing a configuration example of a payment server.

FIG. 5 is a block diagram showing a configuration example of the payment server.

As shown in FIG. 5, the payment server 105 includes a CPU 251, a ROM 252 and a RAM 253 which are connected to one another through a bus 254 as in the case of the wireless communication device 101. An input/output interface 260 is connected to the bus 254.

To the input/output interface 260, an input unit 261, an output unit 262, a storage unit 263 and a drive 265 for removable media 266 are connected in the same manner as in the case of the wireless communication device 101. A communication unit 264 is also connected to the input/output interfaced 260 in the same manner as in the content management server 104.

The CPU 251, the ROM 252, the RAM 253, the bus 254, the input/output interface 260, the input unit 261, the output unit 262, the storage unit 263, the communication unit 264, the drive 265 and the removable media 266 of FIG. 5 correspond to the CPU 201, the ROM 202, the RAM 203, the bus 204, the input/output interface 210, the input unit 211 the output unit 212, the storage unit 213, the communication unit 214, the drive 215 and the removable media 216 of FIG. 4, respectively.

A payment processing unit 271 and a customer database 272 are further connected to the input/output interface 210.

The payment processing unit 271 performs payment processing in accordance with a request from the content management server 104 and the like. At that time, the payment processing unit 271 uses information stored and managed by the customer database 272.

The customer database 272 stores and manages information registered in advance which is necessary for payment processing such as a payment mothod of the user. The payment information and the like of each user are stored in the customer database 272 to be managed.

[User Operation]

Figure 6:
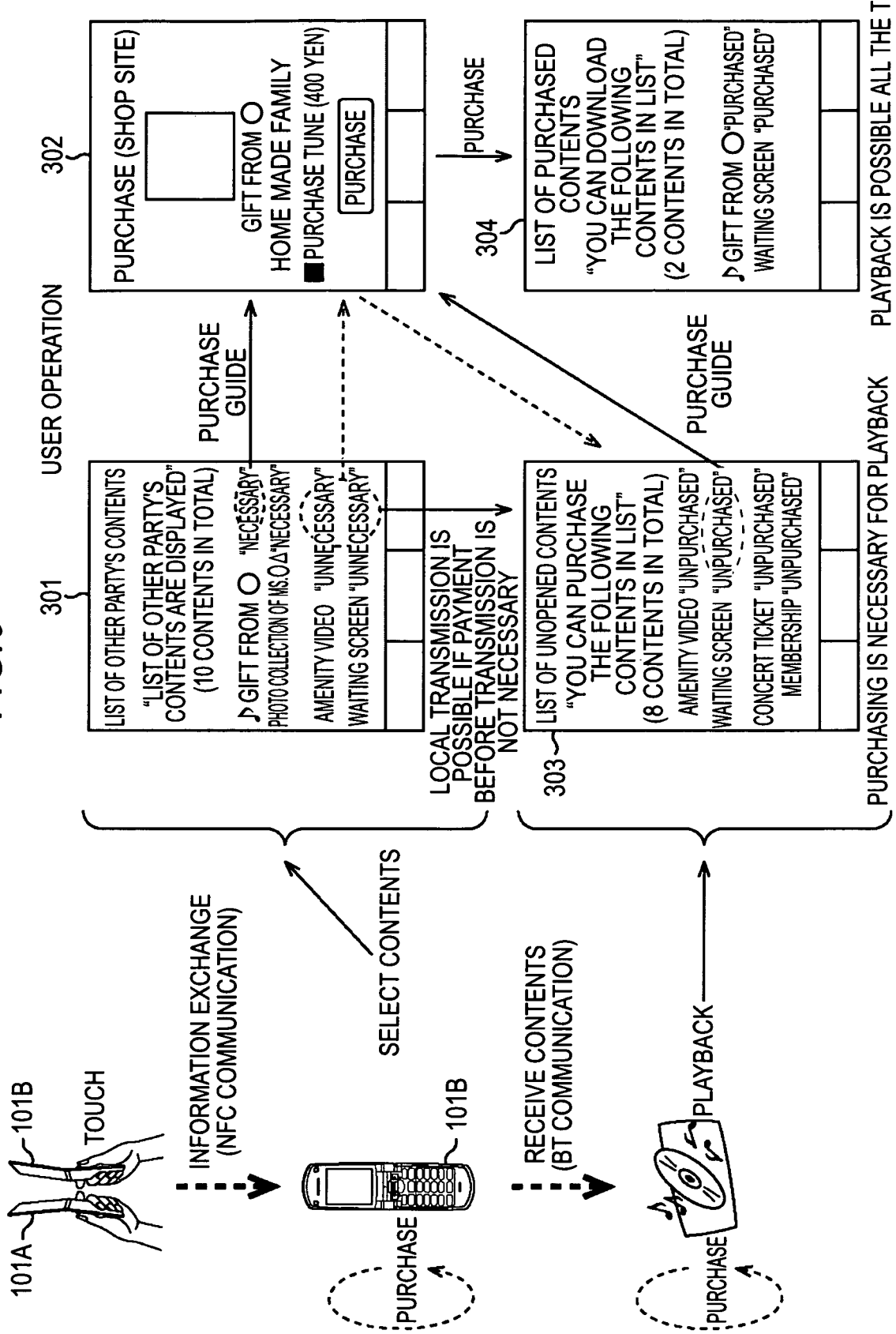
FIG. 6 is a view for explaining examples of a main user operation at the time of distributing contents.

Next, main user operation and the like for content distribution will be explained. FIG. 6 is a view for explaining examples of a main user operation at the time of distributing contents.

As shown in FIG. 6, the process until the user reproduces a content largely goes through three stages which are "to allow the wireless communication devices 101 to touch each other (exchange of content information)", "to perform selection operation of contents on a screen (purchase processing and local transmission of a package)" and "to reproduce the content".

In the following description, to allow casings of the wireless communication devices 101 to touch each other for a short period of time (approximately several seconds) or to be close to each other to a distance of approximately a few tens of centimeters or less will be called "to touch".

During the above respective processes, the following four screens are displayed on a display unit of the acquisition-side wireless communication device 101B.

A first screen is a "list of other party's contents" screen 301.

When the wireless communication device 101 is allowed to "touch" another wireless communication device 101 in a given state, the close-proximity wireless communication units 133 of respective devices establish connection of close proximity wireless communication and exchange messages with each other (information exchange).

A list of distributable contents stored in the supply-side wireless communication device 101A, which have been received by the exchange of messages is displayed on the display unit of the acquisition-side wireless communication device 101B as the list of other party's contents screen 301. In the list of the other party's contents screen 301, "necessary" is displayed on contents in which purchase is necessary before transmission concerning payment timing and "unnecessary" is displayed on contents in which the purchase is not necessary with respect to respective contents.

In the list of the other party's contents screen 301, the user can designate contents to be distributed. When the content designated by the user is the content in which purchase before transmission is necessary, the acquisition-side wireless communication device 101B accesses to the content management server 104. Then, when the device enters into a purchase operation, the screen displayed on the display unit of the acquisition-side wireless communication device 101B is changed to a content purchase screen 302.

When the content in which purchase before transmission is "unnecessary" is designated, the supply-side wireless communication device 101A packages the selected content with other "unnecessary" contents and supplies the package by the near field wireless communication. The acquisition-side wireless communication device 101B acquires the package by the near field wireless communication. When the contents are distributed in this manner, the screen displayed on the display unit of the acquisition-side wireless communication device 101B is changed to a "list of unopened contents" screen 303 on which the list of the distributed contents are displayed.

The second screen is the "purchase (shop site)" screen 302. The acquisition-side wireless communication device 101B displays the purchase screen 302 after connecting to the content management server 104 which performs content purchase processing. When the user of the acquisition-side wireless communication device 101B agrees to the substance of the content, a price and use conditions and so on displayed on the purchase screen 302, the user presses down a "purchase button". According to the operation, the purchase processing is performed by the content management server 104.

When the purchase processing is performed before distribution, the supply-side wireless communication device 101A supplies the purchased contents to the acquisition-side wireless communication device 101B. At this time, the purchased contents are packaged with other contents in which purchase before distribution is not necessary and supplied to the acquisition-side wireless communication device 101B.

The user of the acquisition-side wireless communication device 101B can confirm the purchased contents on a "list of purchased contents" screen 304. The user of the acquisition-side wireless communication device 101B can confirm the contents other than the purchased contents on the "list of unopened contents" screen 303.

The third screen is the "list of unopened contents" screen 303. The list of unpurchased contents which have been acquired by the near field wireless communication is displayed on the "list of unopened contents" screen 303. It is necessary that the user purchases contents when the user desires to reproduce the contents on the list. When the user selects a content, the acquisition-side wireless communication device 101B accesses to the content management server 104. The screen displayed on the display unit is changed to the content purchase screen.

The fourth screen is the "list of purchased contents" screen 304. The list of the purchased contents which have been acquired by the near field wireless communication is displayed on the "list of purchased contents" screen 304. All contents on the list are ready to be reproduced.

[Functional Blocks]

Figure 7:
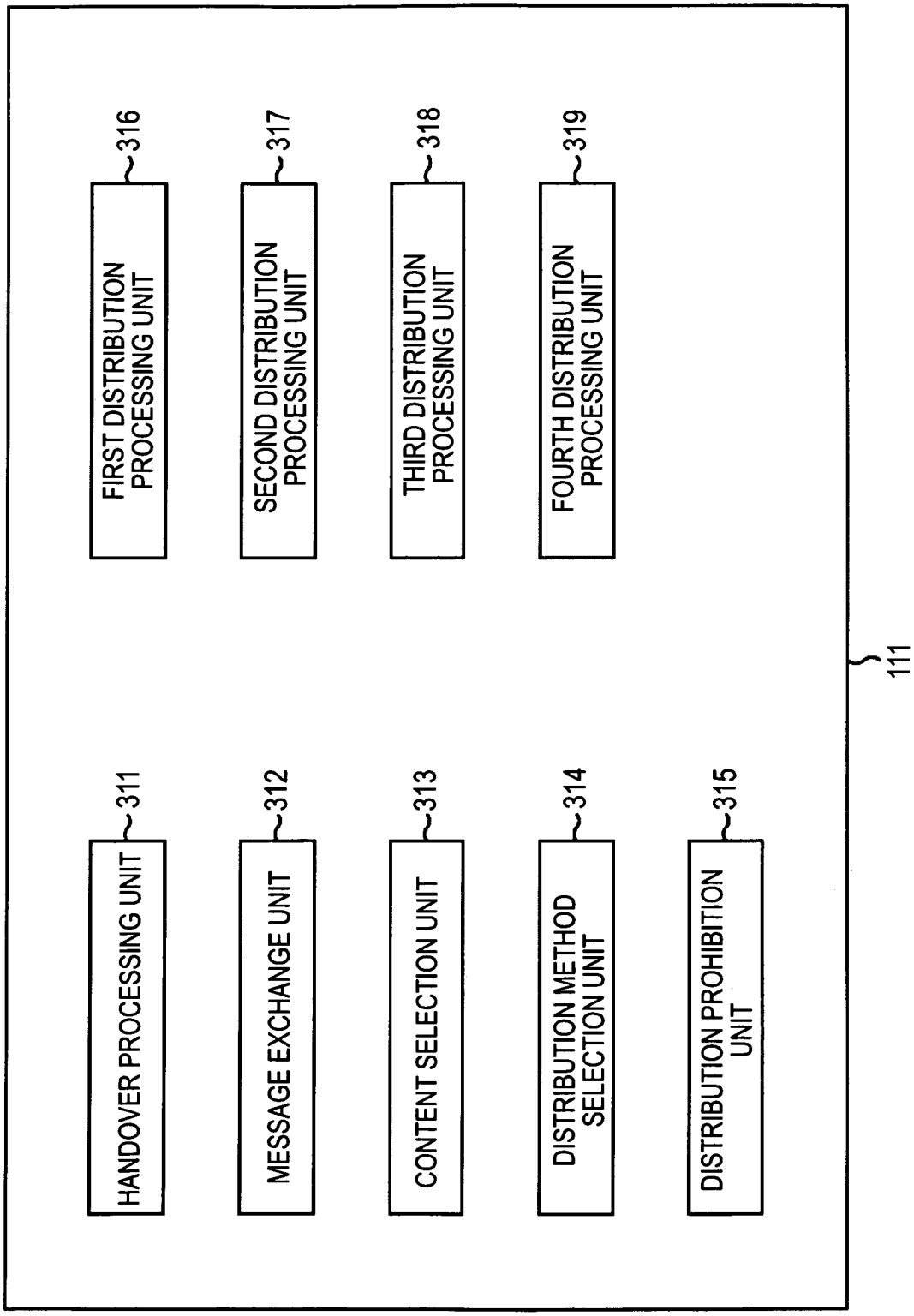
FIG. 7 is a functional block diagram showing a configuration example of functions included in the wireless communication device.

FIG. 7 is a functional block diagram showing a configuration example of functions included in the wireless communication device 101.

As shown in FIG. 7, the CPU 111 of the wireless communication device 101 includes a handover processing unit 311, a message exchange unit 312, a content selection unit 313, a distribution method selection unit 314, a distribution prohibition unit 315, a first distribution processing unit 316, a second distribution processing unit 317, a third distribution processing unit 318 and a fourth distribution processing unit 319.

The handover processing unit 311 performs processing concerning handover processing in which the near-field wireless communication connection is established only by allowing the wireless communication devices 101 to touch each other by the users.

The message exchange unit 312 receives and gives messages using the near field wireless communication. The content selection unit 313 performs processing concerning selection of contents. The distribution method selection unit 314 performs processing concerning selection of a method of distributing contents. The distribution prohibition unit 315 prohibits distribution of contents. The first distribution processing unit 316 to the fourth distribution processing unit 319 perform processing of distributing contents by methods different from one another.

[Message]

Figure 8:
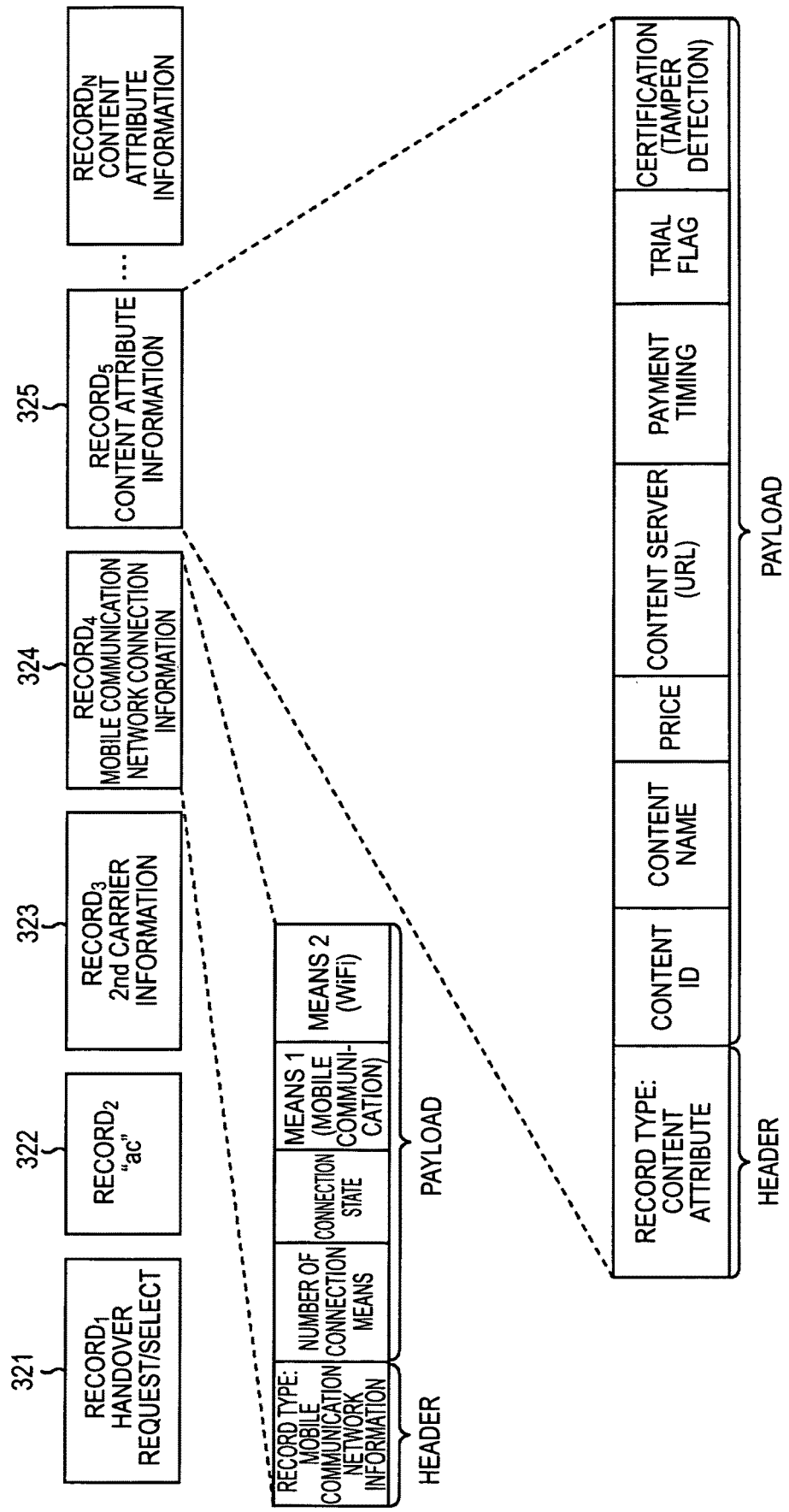
FIG. 8 is a view for explaining a configuration example of a message.

FIG. 8 is a view for explaining a configuration example of a message transmitted or received by close-proximity wireless communication. An NFC communication packet used for the invention is configured based on "Connection Handover Technical Specification" (NFC Forum).

A packet format for NFC communication is defined as "NFC Data Exchange Format Technical Specification" (NFC Forum). In a header portion of a first NDEFRecord, RecordType for handover ("Hr" or "Hs") indicating that an NDEF message is for handover is stored. Here, handover means switching processing from the NFC communication (close proximity wireless communication) to the near-field wireless communication device (second carrier) as described above.

A second NDEFRecord plays a role of storing a second carrier candidate, storing "ac (Alternative Carrier)" is stored in RecordType of the header portion, and a pointer to Record of each second carrier is stored in a payload portion.

In RecordType of the header portion of a third NDEFRecord, information concerning the second carrier (second carrier information) is stored. For example, when the second carrier is Bluetooth (Trademark), an identifier of "application/vnd.bluetooth.ep.oob" indicating Bluetooth authentication information is stored. In a payload portion, authentication information (BD address (Bluetooth Device Address), random digits, hash values and the like) prescribed by a specification of Bluetooth core version 2.1 is stored.

The message exchange unit 312 adds fourth and subsequent Records at the rear end of these NDEFRecords (NFC Data Exchange Format Records).

In the fourth Record, mobile communication network connection information is stored. An identifier indicating the mobile communication connection information is stored in RecordType which is the header portion. In the payload portion, the number of connection means to the mobile communication network, a current connection state of the mobile communication network and methods of respective connection means are sequentially stored.

The connection to the mobile communication network may be possible by devices in communication systems other than the mobile-communication network wireless communication unit 131. For example, a WiFi (Trademark) device can be connected to the mobile communication network by passing through a relay station such as an access point. In such case, information concerning WiFi (Trademark) is also stored in the fourth Record as one of the connection means as shown in FIG. 8. Therefore, the number of connection means to the mobile communication network is "2".

In the fifth and subsequent Records, attribute information of respective contents is stored. In RecordType which is the header portion, an identifier of "contents_attr" indicating content attribute information is stored. Then, in the payload portion, attribute information of each content such as a content ID, a content name, a price, an URL of a content server, a payment timing, a trial flag and certification for tamper detection is stored. The number of Records for content attribute corresponding to the number of contents is prepared.

[Flow of Handover Processing]

The wireless communication device 101 performs close proximity communication with another wireless communication device 101 which has touched the wireless communication device 101, exchanging messages to establish the connection of close-proximity wireless communication by using information for the near field wireless communication included in the messages.

An example of the flow of the above handover processing is explained with reference to a flowchart of FIG. 9.

The close-proximity wireless communication units 133 of respective devices are controlled by the handover processing units 311 to establish the connection of close proximity wireless communication with respect to the other party (another wireless communication device 101) which has touched the wireless communication device 101 (Step S101 and Step S111).

After the connection of close proximity wireless communication has been established, the message exchange units 312 of respective devices exchange messages with each other through the close-proximity wireless communication units 133 (Step S102, Step S103, Step S112 and Step S113).

The near-field wireless communication units 132 of respective devices are controlled by the handover processing units 311 to establish the connection of near field wireless communication with respect to the other party (another wireless communication device 101) by using information concerning the connection of near field wireless communication included in the messages (Step S104 and Step S114).

The handover processing is performed as described above. In related art, complicated settings and bothersome work were necessary to establish the connection the near field wireless communication, however, these various settings can be exchanged by the close proximity wireless communication by performing the handover processing as described above, therefore, the users of the wireless communication devices 101 can establish the near field wireless communication easily by allowing the casings thereof to touch each other.

[Content Distribution Method]

When the connection of near field wireless communication is established as described above, the distribution method of contents using the near field wireless communication is determined. There are the following methods as the content distribution methods, which include the following operation conditions respectively.

FIG. 10 is a table explaining operation conditions of the content distribution methods.

As shown in FIG. 10, there is a first distribution method in which the contents are transmitted and received before payment. In the case of the first distribution method, it is preferable that both the supply-side wireless communication device 101A and the acquisition-side wireless communication device 101B can access to the content management server 104 at arbitrary timing. However, it is necessary that the acquisition-side wireless communication device 101B is connected to the content management server 104 before viewing the content and that the supply-side wireless communication device 101A is connected to the content management server 104 before the acquisition-side wireless communication device 101B.

There is also a second distribution method in which contents are transmitted and received after payment. In the case of the second distribution method, it is necessary that both the supply-side wireless communication device 101A and the acquisition-side wireless communication device 101B can access to the content management server 104.

There is further a third distribution method in which contents are transmitted and received after payment. In the case of the third distribution method, it is necessary that the acquisition-side wireless communication device 101B can access to the content management server 104, however, it is not always necessary that the supply-side wireless communication device 101A can access to the content management server 104 (it is sufficient that the supply-side wireless communication device 101A can access to the acquisition-side wireless communication device 101B).

As states in which it is difficult to make access, there is a case in which, though the wireless communication device 101 has the function of connecting to the content management server 104, radio waves do not reach due to shielding such as tunnels, a case in which access is temporarily interrupted due to a fact that authentication information such as a SIM card is lost (no reception due to the state) and a case in which the wireless communication device 101 does not have a function of connecting to the content management server 104 originally (no reception due to communication characteristics).

There is further a fourth distribution method in which contents are transmitted and received after payment. In the case of the fourth distribution method, it is necessary that the supply-side wireless communication device 101A can access to the content management server 104, however, it is not always necessary that the acquisition-side wireless communication device 101B can access to the content management server 104 (it is sufficient that acquisition-side wireless communication device 101B can access to the supply-side wireless communication device 101A).

[Flow of Distribution Method Selection Processing]

When the user of the acquisition-side wireless communication device 101B selects desired contents from a content list of the supply-side wireless communication device 101A acquired by the message exchange, the wireless communication device 101 select one of the above distribution methods according to the contents to be distributed, communication status and so on in order to distribute the contents.

First, an example of the distribution method selection processing by the supply-side wireless communication device 101A will be explained with reference to a flowchart of FIG. 11.

When the distribution method selection processing is started, the content selection unit 313 acquires a selected content instruction from the acquisition-side wireless communication device 101B through the near-field wireless communication device unit 132 in Step S131. The selected content instruction is information indicating the selected contents by the user of the acquisition-side wireless communication device 101B, which requests distribution of the contents designated by the selected content instruction.

The content selection unit 313 classifies distributable contents stored in the supply-side wireless communication device 101A into contents selected by the user of the acquisition-side wireless communication device 101B and other contents in Step S132.

The content selection unit 313 performs control so as to perform processing after Step S137 with respect to contents selected by the user of the acquisition-side wireless communication device 101B and performs control so as to perform processing after Step S133 with respect to contents other than the selected contents.

First, processing with respect to contents other than the selected contents will be explained. In Step S133, the content selection unit 313 extracts a group of contents in which payment before transmission is not necessary among the distributable contents group stored in the supply-side wireless communication device 101A.

Concerning contents in which payment is not necessary before transmission, the freedom in distribution of content data itself is permitted as long as payment is completed before viewing contents. That is, the setting is based on the thought that distribution of content data is preferentially performed, therefore, it is desirable that a large number of contents in the setting should be distributed.

Accordingly, the supply-side wireless communication device 101A distributes such contents in which payment is not necessary before transmission (before distribution) even when the contents are not selected by the user.

In Step S134, the distribution method selection unit 314 determines whether both the supply-side wireless communication device 101A and the acquisition-side wireless communication device 101B have the function of connecting to the mobile communication network or not.

When it is determined that at least one of them does not have the function of connecting to the mobile communication network and is not capable of connecting to the content management server 104, the process proceeds to Step S135.

In Step S135, the distribution prohibition unit 315 prohibits distribution of other contents.

When it is determined that both the supply-side wireless communication device 101A and the acquisition-side wireless communication device 101B have the function of connecting to the mobile communication network in Step S134, the process proceeds to Step S136.

In Step S136, the first distribution processing unit 316 distributes other contents in the first distribution method (case 1).

Next, processing with respect to contents selected by the user of the acquisition-side wireless communication device 101B will be explained. In Step S137, the distribution method selection unit 314 determines whether the contents selected by the user are contents in which payment is necessary before transmission or not. When it is determined that the payment is not necessary, the process returns to Step S134 and the distribution method is determined in the same manner as other contents.

When it is determined that the payment is necessary before transmitting the contents in Step S137, the process proceeds to Step S138. In Step S138, the distribution method selection unit 314 determines whether both the supply-side wireless communication device 101A and the acquisition-side wireless communication device 101B have reception (have the function of connecting to the mobile communication network as well as are capable of connecting to the network at present) or not.

When it is determined that both devices have reception, the process proceeds to Step S139. In Step S139, the second distribution processing unit 317 distributes of the contents selected by the user in the second distribution method (case 2).

When it is determined that at least one of the supply-side wireless communication device 101A and the acquisition-side wireless communication device 101B has no reception (does not have the function of connecting to the mobile communication network or is not capable of connecting to the network at present) in Step S138, the process proceeds to Step S140.

In Step S140, the distribution method selection unit 314 determines whether the acquisition-side wireless communication device 101B has reception (has the function of connecting to the mobile communication network as well as is capable of connecting to the network at present) or not.

When it is determined that the acquisition-side wireless communication device 101B has reception, the process proceeds to Step S141. In Step S141, the third distribution processing unit 318 distributes contents selected by the user in the third distribution method (case 3).

When it is determined that the acquisition-side wireless communication device 101B has no reception (does not have the function of connecting to the mobile communication network or is not capable of connecting to the network at present) in Step S140, the process proceeds to Step S142.

In Step S142, the distribution method selection unit 314 determines whether the supply-side wireless communication device 101A has reception (has the function of connecting to the mobile communication network as well as is capable of connecting to the network at present) or not.

When it is determined that the supply-side wireless communication device 101A has reception, the process proceeds to Step S143. In Step S143, the fourth distribution processing unit 319 distributes contents selected by the user in the fourth distribution method (case 4).

When it is determined that the supply-side wireless communication device 101A has no reception (does not have the function of connecting to the mobile communication network or is not capable of connecting to the network at present) in Step S142, the process proceeds to Step S144.

In this case, both the supply-side wireless communication device 101A and the acquisition-side wireless communication device 101B have no reception, therefore, the distribution prohibition unit 315 prohibits distribution of contents selected by the user in Step S144.

Figure 12:
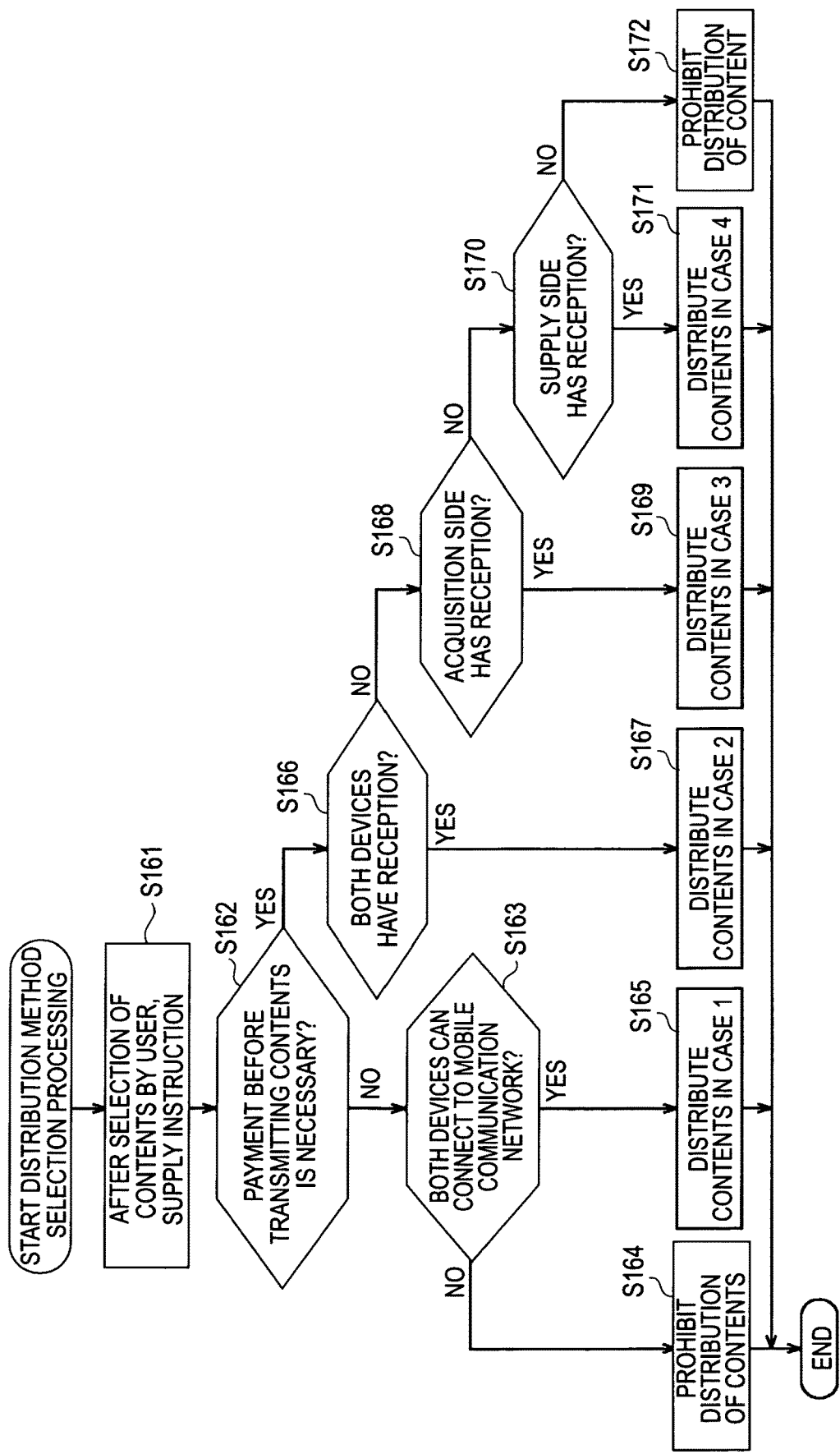
FIG. 12 is a flowchart for explaining an example of distribution method selection processing.

Next, an example of the flow of the distribution method selection processing by the acquisition-side wireless communication device 101B will be explained with reference to a flowchart of FIG. 12.

The acquisition-side wireless communication device 101B selects the distribution method only with respect to the contents selected by the user. The distribution method of the contents other than the selected contents is determined by the supply-side wireless communication device 101A.

When contents are selected by the user, the content selection unit 313 supplies a selected content instruction to the supply-side wireless communication device 101A in Step S161.

After supplying the selected content instruction, the distribution method selection unit 314 selects the distribution method of contents concerning the content selected by the user. However, inconvenience occurs when the selection is different from the selection by the supply-side wireless communication device 101A, therefore, the distribution method selection unit 314 of the acquisition-side wireless communication device 101B makes a selection in the same manner as the supply-side wireless communication device 101A.

That is, respective processing from Step S162 to Step S172 is performed in the same manner as respective processing from Step S135 to Step S144 of FIG. 11.

As described above, the wireless communication device 101 can increase legitimate distribution opportunity of contents under more various conditions by selecting the distribution method according to contents, communication status and so on.

Next, respective distribution methods will be explained.
[First Distribution Method]

FIG. 13 is a view for explaining an example of the main flow of the first distribution method.

The first distribution method is applied when contents (encryption processing is fundamental) can be transmitted before payment as well as both the supply-side wireless communication device 101A and the acquisition-side wireless communication device 101B can be connected to the mobile communication network.

First, connection information of the near field wireless communication and the content list are exchanged by the close-proximity wireless communication (NFC communication) (processing "0"). The acquisition-side wireless communication device 101B supplies the selected content instruction including content IDs of the contents selected by the user to the supply-side wireless communication device 101A. The transmission and reception of the selected content instruction may be performed by either the close-proximity wireless communication or the near-field wireless communication.

When the distribution method selection processing is performed and the first distribution method is selected, the supply-side wireless communication device 101A generates an encryption key for encrypting the extracted content data (processing 1). The supply-side wireless communication device 101A encrypts content data to be transmitted by using the generated encryption key (processing 2), and when there exist plural content data, they are packaged to one data (processing 3).

It is preferable that encryption of content data is performed with respect to each content data (encryption is performed by using encryption keys different according to respective content data) and is also preferable that encryption is performed in the packaged state (plural content data are encrypted by a signal encryption key). Naturally, it is preferable that both processing is performed (after respective content data are encrypted by the encryption keys dedicated to respective content data, encrypted plural content data are packaged and the package is further encrypted by an encryption key for the package).

The supply-side wireless communication device 101A supplies encrypted content data to the acquisition-side wireless communication device 101B by the near field wireless communication (Processing 4). The acquisition-side wireless communication device 101B acquires the content data (processing 5).

The supply-side wireless communication device 101A supplies the used encryption key to the content management server 104 through the mobile communication network (processing 6). The content management server 104 acquires (processing 7) and stores (processing 8) the encryption key.

The acquisition-side wireless communication device 101B performs purchase processing before reproducing content data. When the user performs purchase operation, the acquisition-side wireless communication device 101B connects to the content management server 104 from an URL acquired from attribute information of the selected content, supplying a purchase command including the content ID and information concerning the payment method to the content management server 104 (processing 9).

When acquiring the purchase command (processing 10), the content management server 104 connects to the proper payment server 105 in accordance with the payment method and relays the command between the user and the payment server 105 to confirm that the payment processing has completed (processing 11).

After the completion of payment, the content management server 104 supplies the encryption key corresponding to the content to the acquisition-side wireless communication device 101B (processing 12). The acquisition-side wireless communication device 101B acquires the encryption key (processing 13) and decrypts the content data by using the encryption key (processing 14) to reproduce the content data (processing 15).

FIGS. 14A to 14C are functional block diagrams for explaining functional blocks concerning the first distribution method.

As shown in FIG. 14A, the first distribution processing unit 316 of the supply-side wireless communication device 101A (referred to as a first distribution processing unit 316A in the following description) includes a key generation unit 341, an encryption unit 342, a packaging unit 343, a content supplying unit 344 and a key supplying unit 345.

As shown in FIG. 14B, the first distribution processing unit 316 of the acquisition-side wireless communication device 101B (referred to as a first distribution processing unit 316B) includes a content acquisition unit 361, a purchase processing unit 362, a key acquisition unit 363, a decryption unit 364 and a reproduction unit 365.

As shown in FIG. 14C, the CPU 201 of the content management server 104 includes a key acquisition unit 381, a key storage unit 382, a purchase processing unit 383, a payment processing unit 384 and a key supplying unit 385 as functional blocks.

An example of the main flow of the first content distribution processing executed in the first distribution method will be explained with reference to a flowchart of FIG. 15.

When contents to be distributed are selected, the key generation unit 341 generates the encryption key in Step S201. The encryption unit 342 encrypts each content data to be distributed by using the encryption key in Step S202. In Step S203, the packaging unit 343 packages the group of content data to be distributed. In Step S204, the encryption unit 342 encrypts the package by using the encryption key. It is also preferable that encryption in Step S202 and Step S204 is performed in any one of the steps as described above.

In Step S205, the content supplying unit 344 the encrypted contents which are encrypted content data to the acquisition-side wireless communication device 101B through the near-field wireless communication unit 132. The content acquisition unit 361 acquires the encrypted content through the near-field wireless communication unit 132 in Step S211.

In Step S206, the key supply unit 345 supplies the encryption key used for encryption to the content management server 104 through the mobile-communication network wireless communication unit 131. The key acquisition unit 381 acquires the encryption key through the communication unit 214 in Step S221. The key storage unit 382 stores the acquired encryption key in the content information database 221 and the like in Step S222.

In Step S212, the purchase processing unit 362 accesses to the content management server 104 through the mobile-communication network wireless communication unit 131 to perform purchase processing. In response to the processing, the purchase processing unit 383 performs purchase processing through the communication unit 214 in Step S223.

In Step S224, the payment processing unit 384 accesses to the legitimate payment server 105 through the communication unit 214 with reference to user information in the user information database 222 to perform payment processing. In response to the processing, the payment processing unit 271 of the payment server 105 performs payment processing through the communication unit 264 by using information of the customer database 272 in Step S231.

When the payment processing is completed, the key supplying unit 385 supplies the encryption key corresponding to contents in which payment processing has been performed to the acquisition-side wireless communication device 101B through the communication unit 214 in Step S225. The key acquisition unit 363 acquires the encryption key through the mobile-communication network wireless communication unit 131 in Step S213.

The decryption unit 364 decrypts the encrypted contents by using the acquired encryption key in Step S214. The reproduction unit 365 reproduces content data obtained by decryption in Step S215.

As described above, in the first distribution method, contents can be distributed without performing purchase processing. Therefore, it is not necessary that both the supply-side wireless communication device 101A and the acquisition-side wireless communication device 101B are connected to the content management server 104 at the time of distributing and reproducing contents. That is, the content distribution system 100 can increase legitimate distribution opportunity of contents by using the above distribution method.

When the supply-side wireless communication device 101A has not reception and the acquisition-side wireless communication device 101B connects to the content management server 104 before the supply-side wireless communication device 101A transmits the encryption key, the acquisition-side wireless communication device 101B can previously register purchase intention in the content management server 104 (make a purchase reservation).

After that, when the supply-side wireless communication device 101A enters the communication range and transmits the encryption key to the content management server 104, the content management server 104 performs purchase processing, transmitting notification of purchase completion and the encryption key to the acquisition-side wireless communication device 101B.

[Second Distribution Method]

Next, the second distribution method will be explained. FIG. 16 is a view for explaining an example of the main flow of the second distribution method.

The second distribution method is applied when payment before transmitting contents is fundamental as well as both the supply-side wireless communication device 101A and the acquisition-side wireless communication device 101B can be connected to the mobile communication network.

First, connection information of the near-field wireless communication and the content list are exchanged by the close-proximity wireless communication (NFC communication) (processing "0"). The acquisition-side wireless communication device 101B supplies the selected content instruction including content IDs of the contents selected by the user to the supply-side wireless communication device 101A. The transmission and reception of the selected content instruction may be performed by either the close-proximity wireless communication or the near-field wireless communication.

When the distribution method selection processing is performed and the second distribution method is selected, the acquisition-side wireless communication device 101B connects to the content management server 104 from an URL acquired from attribute information of the selected content, supplying a purchase command including the content ID and information concerning the payment method to the content management server 104 (processing 1).

When acquiring the purchase command (processing 2), the content management server 104 connects to the proper payment server 105 in accordance with the payment method and relays the command between the user and the payment server 105 to confirm that the payment processing has completed (processing 3).

After the completion of payment, the content management server 104 generates an encryption key corresponding to the content (processing 4) and supplies the encryption key to the supply-side wireless communication device 101A and the acquisition-side wireless communication device 101B (processing 5). The acquisition-side wireless communication device 101B acquires the encryption key (processing 6). The supply-side wireless communication device 101A also acquires the encryption key (processing 7).

The supply-side wireless communication device 101A encrypts content data to be transmitted by using the acquired encryption key (processing 8), and when there exist plural content data, they are packaged to one data (processing 9).

It is preferable that encryption of content data is performed with respect to each content data (encryption is performed by using encryption keys different according to respective content data) and is also preferable that encryption is performed in the packaged state (plural content data are encrypted by a signal encryption key). Naturally, it is preferable that both processing is performed (after respective content data are encrypted by the encryption keys dedicated to respective content data, encrypted plural content data are packaged and the package is further encrypted by an encryption key for the package).

The supply-side wireless communication device 101A supplies encrypted content data to the acquisition-side wireless communication device 101B by the near-field wireless communication device (Processing 10). The acquisition-side wireless communication device 101B acquires the content data (processing 11).

The acquisition-side wireless communication device 101B decrypts the content data by using the encryption key supplied from the content management server 104 (processing 12) and reproduces the content data (processing 13).

Figure 17C:
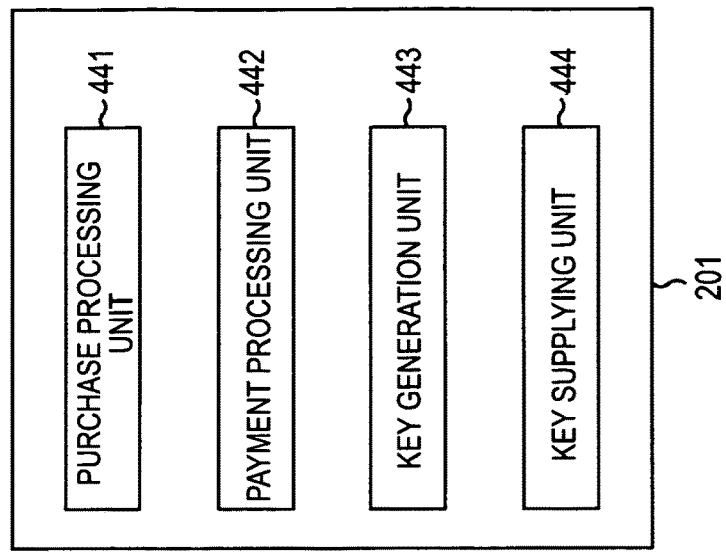
FIG. 17A to 17C are functional block diagrams for explaining functional blocks concerning the second distribution method.
Figure 17B:
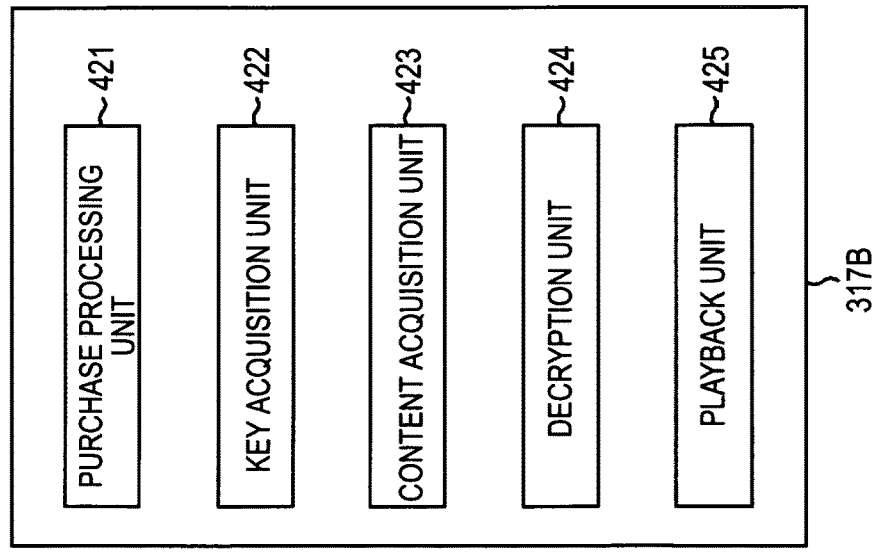
Figure 17A:
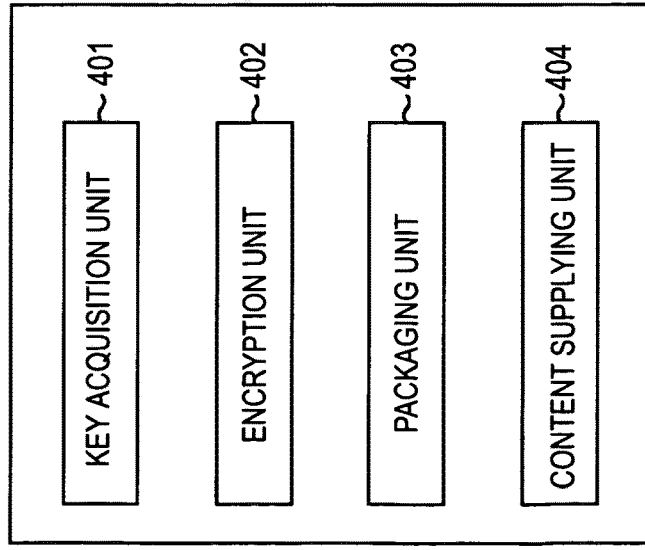

FIG. 17A to 17C are functional block diagrams for explaining functional blocks concerning the second distribution method.

As shown in FIG. 17A, a second distribution processing unit 317 of the supply-side wireless communication device 101A (referred to as a second distribution processing unit 317A in the following description) includes a key acquisition unit 401, an encryption unit 402, a packaging unit 403 and a content supplying unit 404.

As shown in FIG. 17B, the second distribution processing unit 317 of the acquisition-side wireless communication device 101B (referred to as a second distribution processing unit 317B in the following description) includes a purchase processing unit 421, a key acquisition unit 422, a content acquisition unit 423 and a decryption unit 424 and a reproduction unit 425.

As shown in FIG. 17C, the CPU 201 of the content management server 104 includes a purchase processing unit 441, a payment processing unit 442, a key generation unit 443 and a key supplying unit 444 as functional blocks.

Figure 18:
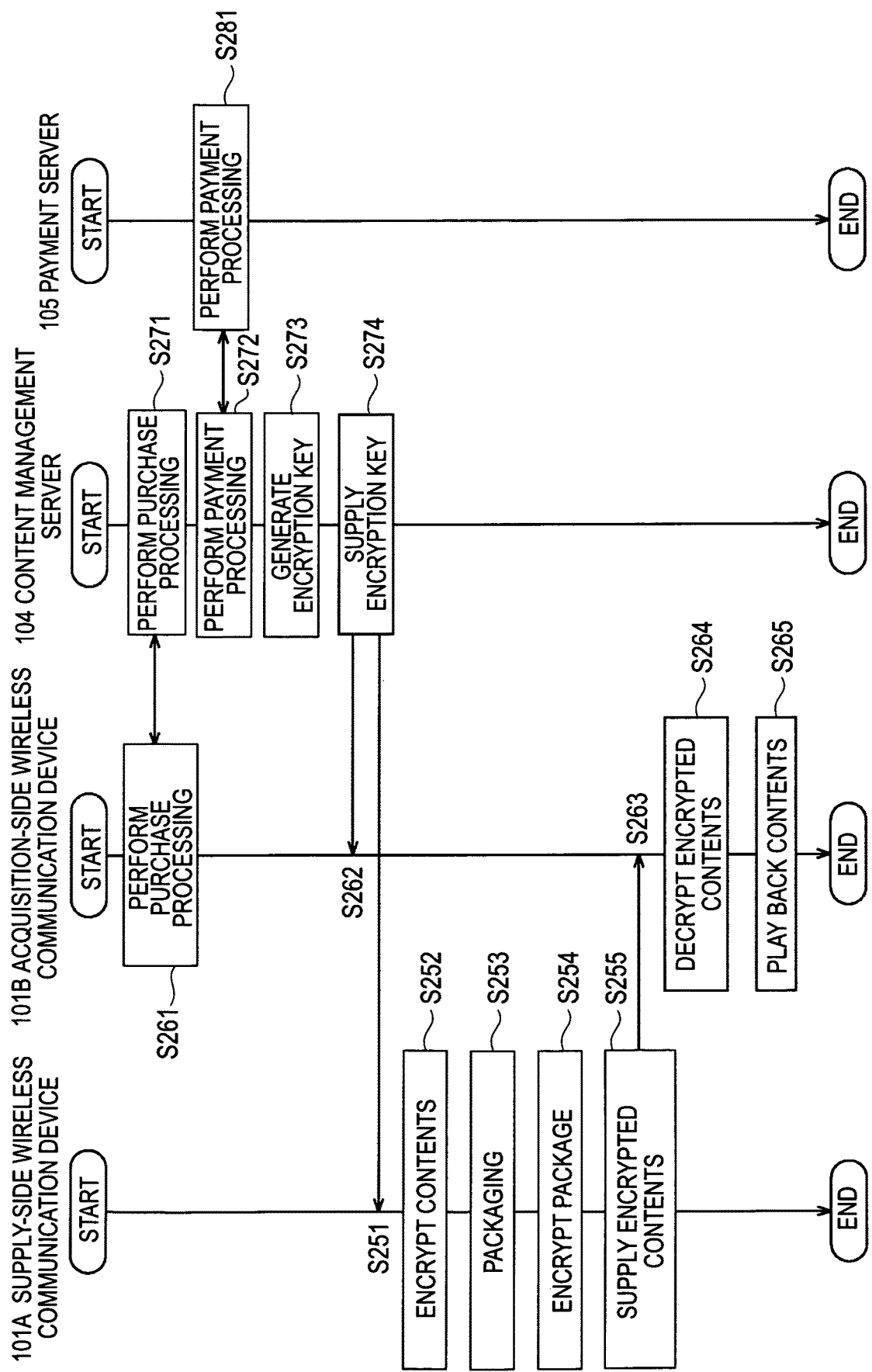
FIG. 18 is a flowchart for explaining an example of the main flow of second content distribution processing.

An example of the main flow of the second content distribution processing executed in the second distribution method will be explained with reference to a flowchart of FIG. 18.

When contents to be distributed are selected, the purchase processing unit 421 accesses to the content management server 104 through the mobile-communication network wireless communication unit 131 to perform purchase processing in Step S261. In response to the processing, the purchase processing unit 441 performs purchase processing through the communication unit 214 in Step S271.

In Step S272, the payment processing unit 442 accesses to the legitimate payment server 105 through the communication unit 214 with reference to user information of the user information database 222 to perform payment processing. In response to the processing, the payment processing unit 271 of the payment server 105 performs payment processing through the communication unit 264 by using information of the customer database 272 in Step S281.

When the payment processing is completed, the key generation unit 443 generates an encryption key with respect to the content data in which purchase processing has been performed in Step S273. In Step S274, the key supplying unit 444 supplies the generated encryption key to the supply-side wireless communication device 101A and the acquisition-side wireless communication device 101B through the communication unit 214. The key acquisition unit 401 acquires the encryption key through the mobile-communication network wireless communication unit 131 in Step S251. At the same time, the key acquisition unit 422 acquires the encryption key through the mobile-communication network wireless communication unit 131 in Step S262.

The encryption unit 402 encrypts each content data to be distributed by using the encryption key in Step S252. In Step S253, the packaging unit 403 packages the content data group to be distributed. In Step S254, the encryption unit 402 encrypts the package by the encryption key. It is also preferable that encryption in Step S252 and Step S254 is performed in any one of the steps as described above.

In Step S255, the content supplying unit 404 supplies the encrypted contents which are encrypted content data to the acquisition-side wireless communication device 101B through the near-field wireless communication unit 132. The content acquisition unit 423 acquires the encrypted contents through the near-field wireless communication unit 132 in Step S263.

The decryption unit 424 decrypts the encrypted contents supplied from the supply-side wireless communication device 101A by using the encryption key supplied from the content management server 104 in Step S264. The reproduction unit 425 reproduces the content data obtained by decryption in Step S265.

As described above, in the second distribution method, contents can be distributed after performing purchase processing. It is necessary that both the supply-side wireless communication device 101A and the acquisition-side wireless communication device 101B are connected to the content management server 104 at the time of distributing and reproducing contents. Therefore, contents in which prohibition of illegal distribution is regarded as important can be distributed with security. That is, the content distribution system 100 can increase legitimate distribution opportunity of contents by using the above distribution method.

[Third Distribution Method]

Figure 19:
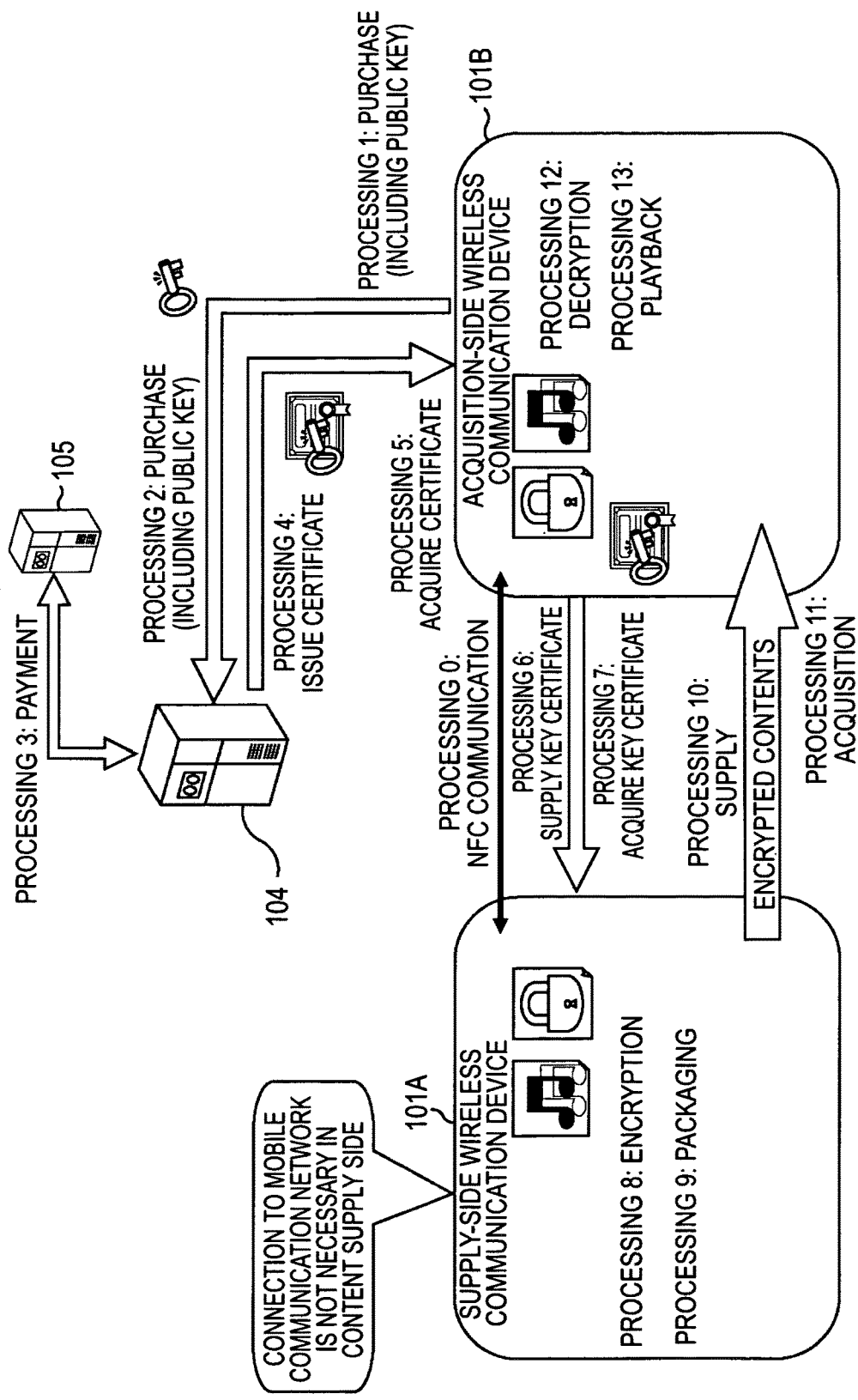
FIG. 19 is a view for explaining an example of the main flow of a third distribution method.

Next, the third distribution method will be explained. FIG. 19 is a view for explaining an example of the main flow of the third distribution method.

The third distribution method is applied when payment before transmitting contents is fundamental as well as only the acquisition-side wireless communication device 101B can be connected to the mobile communication network.

First, connection information of the near-field wireless communication and the content list are exchanged by the close-proximity wireless communication (NFC communication) (processing "0"). The acquisition-side wireless communication device 101B supplies the selected content instruction including content IDs of the contents selected by the user to the supply-side wireless communication device 101A. The transmission and reception of the selected content instruction may be performed by either the close-proximity wireless communication or the near-field wireless communication.

When the distribution method selection processing is performed and the third distribution method is selected, the acquisition-side wireless communication device 101B generates a public key (a secret key corresponding to the public key) and connects to the content management server 104 by an URL acquired from attribute information of the selected content to supply a purchase command including the content ID, information concerning the payment method and the public key to the content management server 104 (processing 1).

When acquiring the purchase command (processing 2), the content management server 104 connects to the proper payment server 105 in accordance with the payment method and relays the command between the user and the payment server 105 to confirm that the payment processing has completed (processing 3).

After the completion of payment, the content management server 104 issues a certificate with respect to the purchased content ID and encrypts the certificate by the public key. After that, the content management server 104 supplies the encrypted certificate to the acquisition-side wireless communication device 101B (processing 4). The acquisition-side wireless communication device 101B acquires the certificate (processing 5).

The acquisition-side wireless communication device 101B decrypts the certificate by the secret key, supplying the certificate, the public key and the content ID to the supply-side wireless communication device 101A by using the near-field wireless communication (Processing 6). The supply-side wireless communication device 101A acquires them (processing 7).

The supply-side wireless communication device 101A determines authenticity of the certificate, then, encrypts content data by using the acquired public key when it is true (processing 8), and when there exist plural content data, they are packaged to one data (processing 9).

It is preferable that encryption of content data is performed with respect to each content data (encryption is performed by using encryption keys different according to respective content data) and is also preferable that encryption is performed in the packaged state (plural content data are encrypted by a signal encryption key). Naturally, it is preferable that both processing is performed (after respective content data are encrypted by the encryption keys dedicated to respective content data, encrypted plural content data are packaged and the package is further encrypted by an encryption key for the package).

The supply-side wireless communication device 101A supplies encrypted content data to the acquisition-side wireless communication device 101B by the near-field wireless communication device (Processing 10). The acquisition-side wireless communication device 101B acquires the content data (processing 11).

The acquisition-side wireless communication device 101B decrypts the content data by using the secret key (processing 12) and reproduces the content data (processing 13).

FIG. 20A to 20C are functional block diagrams for explaining functional blocks concerning the third distribution method.

As shown in FIG. 20A, a third distribution processing unit 318 of the supply-side wireless communication device 101A (referred to as a third distribution processing unit 318A in the following description) includes a key certificate acquisition unit 461, an encryption unit 462, a packaging unit 463 and a content supply unit 464.

As shown in FIG. 20B, the third distribution processing unit 318 of the acquisition-side wireless communication device 101B (referred to as a third distribution processing unit 318B in the following description) includes a purchase processing unit 481, a certificate acquisition unit 482, a key certificate supply unit 483, a content acquisition unit 484, a decryption unit 485 and a reproduction unit 486.

As shown in FIG. 20C, the CPU 201 of the content management server 104 includes a purchase processing unit 501, a payment processing unit 502 and a certificate issuing unit 503 as functional blocks.

An example of the main flow of the third content distribution processing executed in the third distribution method will be explained with reference to a flowchart of FIG. 21.

When contents to be distributed are selected, the purchase processing unit 481 accesses to the content management server 104 through the mobile-communication network wireless communication unit 131 to perform purchase processing in Step S311. In response to the processing, the purchase processing unit 501 performs purchase processing through the communication unit 214 in Step S321.

In Step S322, the payment processing unit 502 accesses to the legitimate payment server 105 through the communication unit 214 with reference to user information of the user information database 222 to perform payment processing. In response to the processing, the payment processing unit 271 of the payment server 105 performs payment processing through the communication unit 264 by using information of the customer database 272 in Step S331.

When the payment processing is completed, the certificate issuing unit 503 issues the certificate with respect to content data in which purchase processing has been completed and encrypts the certificate by the secret key, then, supplies the encrypted certificate to the acquisition-side wireless communication device 101B through the communication unit 214 in Step S323. In Step S312, the certificate acquisition unit 482 acquires the encrypted certificate through the mobile-communication network wireless communication unit 131.

After decrypting the acquired certificate by the secret key, the key certificate supply unit 483 supplies the certificate, the public key and the content ID of content data to be distributed to the supply-side wireless communication device 101 through the near-field wireless communication unit 132 in Step S313. The key certificate acquisition unit 461 acquires them through the near-field wireless communication unit 132 in Step S301.

After determining authenticity of the certificate, the encryption unit 462 encrypts each content data to be distributed by using the acquired public key when the certificate is true in Step S302. In Step S303, the packaging unit 463 packages the content data group to be distributed. In Step S304, the encryption unit 462 encrypts the package by using the public key. It is also preferable that encryption in Step S302 and Step S304 is performed in any one of the steps as described above.

In Step S305, the content supplying unit 464 supplies the encrypted contents which are encrypted content data to the acquisition-side wireless communication device 101B through the near-field wireless communication unit 132. The content acquisition unit 484 acquires the encrypted contents through the near-field wireless communication unit 132 in Step S314.

The decryption unit 485 decrypts the encrypted contents supplied from the supply-side wireless communication device 101A by using the secret key in Step S315. The reproduction unit 486 reproduces the content data obtained by decryption in Step S316.

As described above, in the third distribution method, contents can be distributed after performing purchase processing. It is necessary that the acquisition-side wireless communication device 101B is connected to the content management server 104, however, the supply-side wireless communication device 101A is not necessary to be connected thereto. Therefore, contents in which prohibition of illegal distribution is regarded as important can be distributed with security even when it is difficult that the second distribution method is applied. That is, the content distribution system 100 can increase legitimate distribution opportunity of contents by using the above distribution method.

[Fourth Distribution Method]

Next, the fourth distribution method will be explained. FIG. 22 is a view for explaining an example of the main flow of the fourth distribution method.

The fourth distribution method is applied when payment before transmitting contents is fundamental as well as only the supply-side wireless communication device 101A can be connected to the mobile communication network.

First, connection information of the near field wireless communication and the content list are exchanged by the close-proximity wireless communication (NFC communication) (processing "0"). The acquisition-side wireless communication device 101B supplies the selected content instruction including content IDs of the contents selected by the user to the supply-side wireless communication device 101A. The transmission and reception of the selected content instruction may be performed by either the close-proximity wireless communication or the near-field wireless communication.

When the distribution method selection processing is performed and the fourth distribution method is selected, the acquired-side wireless communication device 101B supplies a VPN (Virtual Private Network) connection command for the server of an URL acquired by the processing "0" to the supply-side wireless communication device 101A by using the near field wireless communication. The supply-side wireless communication device 101A which has acquired the command accesses to the content management server 104 through the mobile communication network. The acquisition-side wireless communication device 101B and the content management server 104 encrypt the transmission channel by setting the supply-side wireless communication device 101A as a relay point to establish a virtual transmission channel (VPN) (processing 1 and processing 2). Information to be transmitted and received through the VPN is encrypted and it is difficult that the supply-side wireless communication device 101A refers to the information.

The acquisition-side wireless communication device 101B supplies the purchase command including the content ID to the content management server 104 (processing 3) by using the VPN.

When acquiring the purchase command (processing 4), the content management server 104 connects to the proper payment server 105 in accordance with the payment method and relays the command between the user and the payment server 105 to confirm that the payment processing has been completed (processing 5).

After the completion of payment, the content management server 104 generates an encryption key with respect to the content (processing 6) and supplies the encryption key to the supply-side wireless communication device 101A and the acquisition-side wireless communication device 101B (processing 7). The supply of the encryption key to the acquisition-side wireless communication device 101B is performed through the VPN.

The acquisition-side wireless communication device 101B acquires the encryption key (processing 8). The supply-side wireless communication device 101A also acquires the encryption key (processing 9).

The supply-side wireless communication device 101A encrypts the content data to be transmitted by using the acquired encryption key (processing 10) and, when there exist plural content data, they are packaged to one data (processing 11).

It is preferable that encryption of content data is performed with respect to each content data (encryption is performed by using encryption keys different according to respective content data) and is also preferable that encryption is performed in the packaged state (plural content data are encrypted by a signal encryption key). Naturally, it is preferable that both processing is performed (after respective content data are encrypted by the encryption keys dedicated to respective content data, encrypted plural content data are packaged and the package is further encrypted by an encryption key for the package).

The supply-side wireless communication device 101A supplies encrypted content data to the acquisition-side wireless communication device 101B by the near-field wireless communication device (Processing 12). The acquisition-side wireless communication device 101B acquires the content data (processing 13).

The acquisition-side wireless communication device 101B encrypts the content data by using the encryption key supplied from the content management server 104 through the VPN (processing 14) and reproduces the content data (processing 15).

Figure 23C:
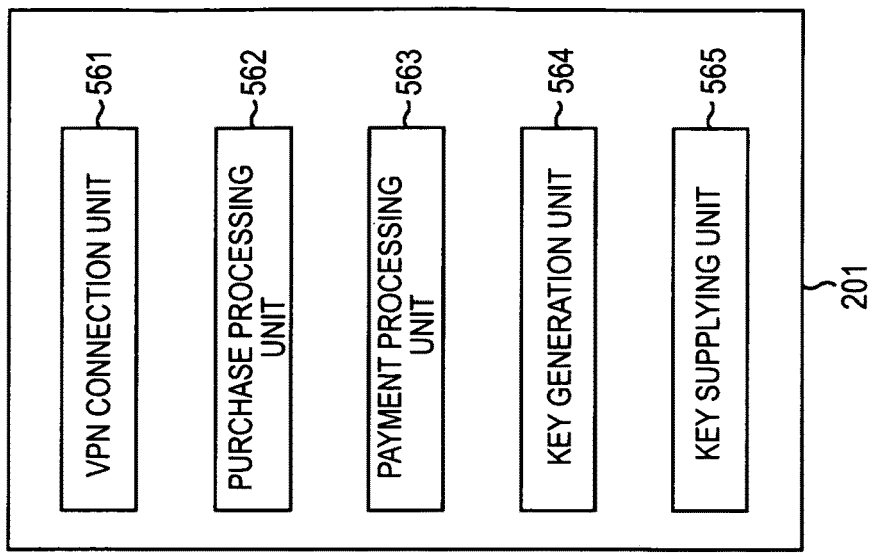
FIG. 23A to 23C are functional block diagrams for explaining functional blocks concerning the fourth distribution method.
Figure 23B:
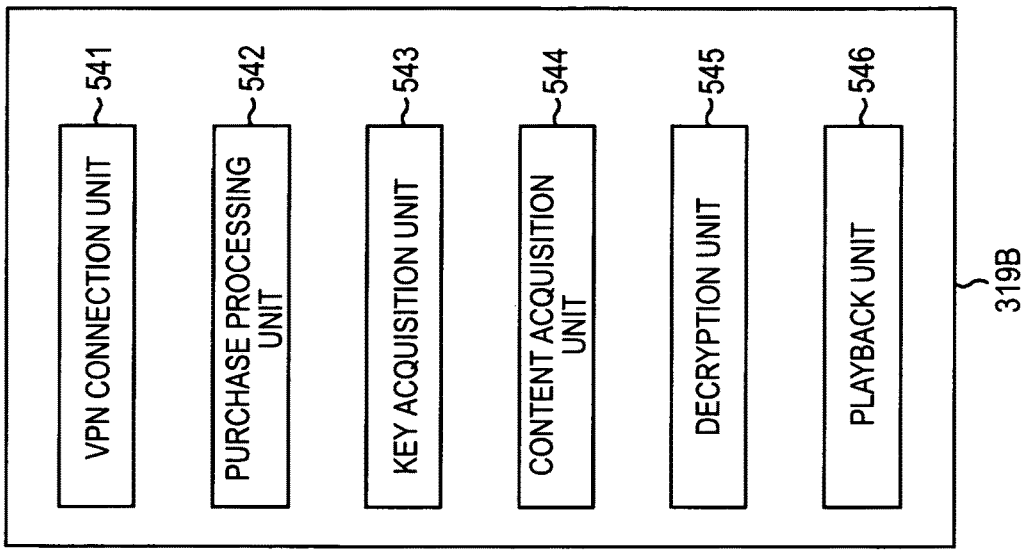
Figure 23A:
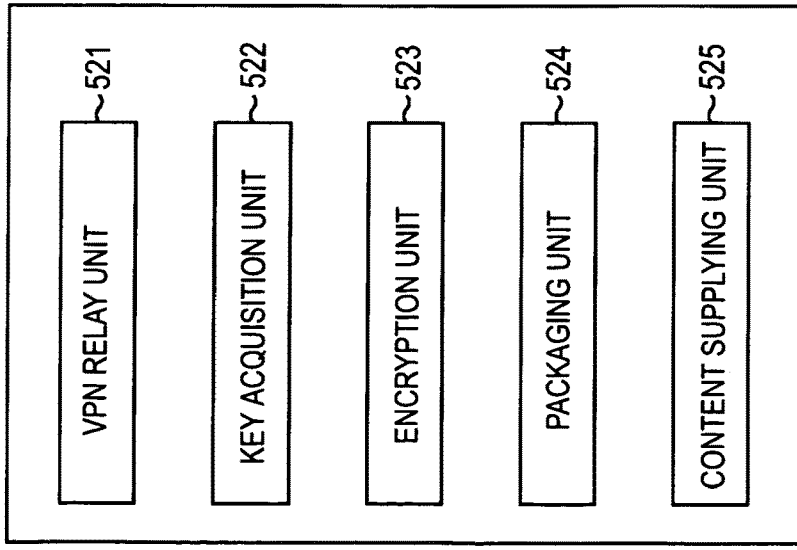

FIG. 23A to 23C are functional block diagrams for explaining functional blocks concerning the fourth distribution method.

As shown in FIG. 23A, a fourth distribution processing unit 319 of the supply-side wireless communication device 101A (referred to as a fourth distribution processing unit 319A in the following description) includes a VPN relay unit 521, a key acquisition unit 522, an encryption unit 523, a packaging unit 524 and a content supplying unit 525.

As shown in FIG. 23B, a fourth distribution processing unit 319 of the acquisition-side wireless communication device 101B (referred to as a fourth distribution processing unit 319B in the following description) includes a VPN connection unit 541, a purchase processing unit 542, a key acquisition unit 543, a content acquisition unit 544, a decryption unit 545 and a reproduction unit 546.

As shown in FIG. 23C, the CPU 201 of the content management server 104 includes a VPN connection unit 561, a purchase processing unit 562, a payment processing unit 563, a key generation unit 564 and a key supplying unit 565 as functional blocks.

An example of the main flow of the fourth content distribution processing executed in the fourth distribution method will be explained with reference to a flowchart of FIG. 24.

When contents to be distributed are selected, the VPN connection unit 541 controls the near-field wireless communication unit 132 to establish the VPN connection with respect to the content management server 104 through the supply-side wireless communication device 101A in Step S361.

The VPN relay unit 521 controls the mobile-communication network wireless communication unit 131 and the near-field wireless communication unit 132 to relay the VPN connection in Step S351. The VPN connection unit 561 controls the communication unit 214 in response to the processing to establish the VPN connection in Step S371.

When the VPN connection is established between the acquisition-side wireless communication device 101B and the content management server 104 through the supply-side wireless communication device 101A, the purchase processing unit 542 accesses to the content management server 104 through the near-field wireless communication unit 132 and performs purchase processing in Step S362. In response to the processing, the purchase processing unit 562 performs purchase processing through the communication unit 214 in Step S372.

The purchase processing is performed through the VPN. The communication through the VPN is performed through the supply-side wireless communication device 101A physically, however, information is given and received between the acquisition-side wireless communication device 101B and the content management server 104 substantially (because the supply-side wireless communication device 101A does not interfere with the give and receive of the information). In FIG. 24, the give and receive through the VPN are represented by dotted line.

In Step S373, the payment processing unit 563 refers to user information of the user information database 222 and accesses to the legitimate payment server 105 through the communication unit 214 to perform payment processing. In response to the processing, the payment processing unit 271 of the payment server 105 performs purchase processing through the communication unit 264 by using information of the customer database 272 in Step S381.

When the payment processing is completed, the key generation unit 564 generates an encryption key with respect to the content data in which purchase processing has been completed in Step S374. The key supplying unit 565 supplies the encryption key to the supply-side wireless communication device 101A and the acquisition-side wireless communication device 101B through the communication unit 214 in Step S375. The encryption key to the acquisition-side wireless communication device 101B is supplied through the VPN.

In Step S352, the key acquisition unit 522 acquires the encryption key through the mobile-communication network wireless communication unit 131. The key acquisition unit 543 also acquires the encryption key through the near-field wireless communication unit 132 in Step S363.

The encryption unit 523 encrypts each content data to be distributed by using the acquired encryption key in Step S353. In Step S354, the packaging unit 524 packages the content data group to be distributed. In Step S355, the encryption unit 523 encrypts the package by using the encryption key. It is also preferable that encryption in Step S353 and Step S355 is performed in any one of the steps as described above.

In Step S356, the content supplying unit 525 supplies the encrypted contents which are encrypted content data to the acquisition-side wireless communication device 101B through the near-field wireless communication unit 132. The content acquisition unit 525 acquires the encrypted contents through the near-field wireless communication unit 132 in Step S364.

The decryption unit 545 decrypts the encrypted contents supplied from the supply-side wireless communication device 101A by using the encryption key in Step 365. The reproduction unit 546 reproduces content data obtained by decryption in Step S366.

As described above, in the fourth distribution method, contents can be distributed after performing purchase processing. It is necessary that the supply-side wireless communication device 101A is connected to the content management server 104, however, the acquisition-side wireless communication device 101B is not necessary to be connected thereto. Therefore, contents in which prohibition of illegal distribution is regarded as important can be distributed with security even when it is difficult that the second distribution method and the third distribution method are applied. That is, the content distribution system 100 can increase legitimate distribution opportunity of contents by using the above distribution method.

As described above, the content distribution system 100 can distribute contents by plural distribution methods, therefore, the system can increase legitimate distribution opportunity of contents under more various conditions.

The case in which the give and receive of the content list are performed by the close proximity wireless communication has been described as the above, however, it is also preferable to perform the give and receive the content list by the near field wireless communication.

Additionally, the case in which the establishment of the connection of near field wireless communication device is performed by the handover processing using the close proximity wireless communication has been explained as the above, however, it is also preferable that the connection of near field wireless communication is performed without using handover processing. That is, the close proximity wireless communication is not always fundamental. Naturally, it is preferable that the near field wireless communication is omitted and that all the give and receive of information between wireless communication devices 101 is performed by the close proximity wireless communication. However, in the above case, it is necessary that the close state of the wireless communication devices 101 is maintained when performing give and receive of information between the wireless communication devices 101.

[Other Examples of Mobile Communication Network Connection]

The case in which the wireless communication device 101 connects to the mobile communication network by using the mobile-communication network wireless communication unit 131 has been explained as the above, and it is also possible that the wireless communication device 101 connects to the mobile communication network by using other communication devices through other communication networks in addition to the above case.

The situation is represented in FIG. 25. In the example shown in FIG. 25, the wireless communication device 101 is in an environment in which radio waves are not received from the wireless base station 102. Accordingly, the mobile-communication network wireless communication unit 131 has not reception. However, the wireless communication device 101 also has a WiFi device in this case.

The WiFi device is connected to a router 601 in a hot spot (an access point for public network connection). That is, the wireless communication device 101 is connected to Internet 602 through the router 601.

A gateway server 604 of a mobile communication network 603 includes a port for the Internet 602. Therefore, the wireless communication device 101 can access to the gateway server 604 through the Internet 602, and can connect to the mobile communication network 603 when the device achieves authentication.

As methods of connecting to the mobile communication network through the hot spot (Internet) by using WiFi, roughly three types of methods have been realized, which are a method of performing authentication by using a certificate with a signature, a method of performing authentication by using a common key stored in a SIM (subscriber Identity Module) card and a method of performing authentication by using a one-time password as shown in FIG. 26.

Figure 27:
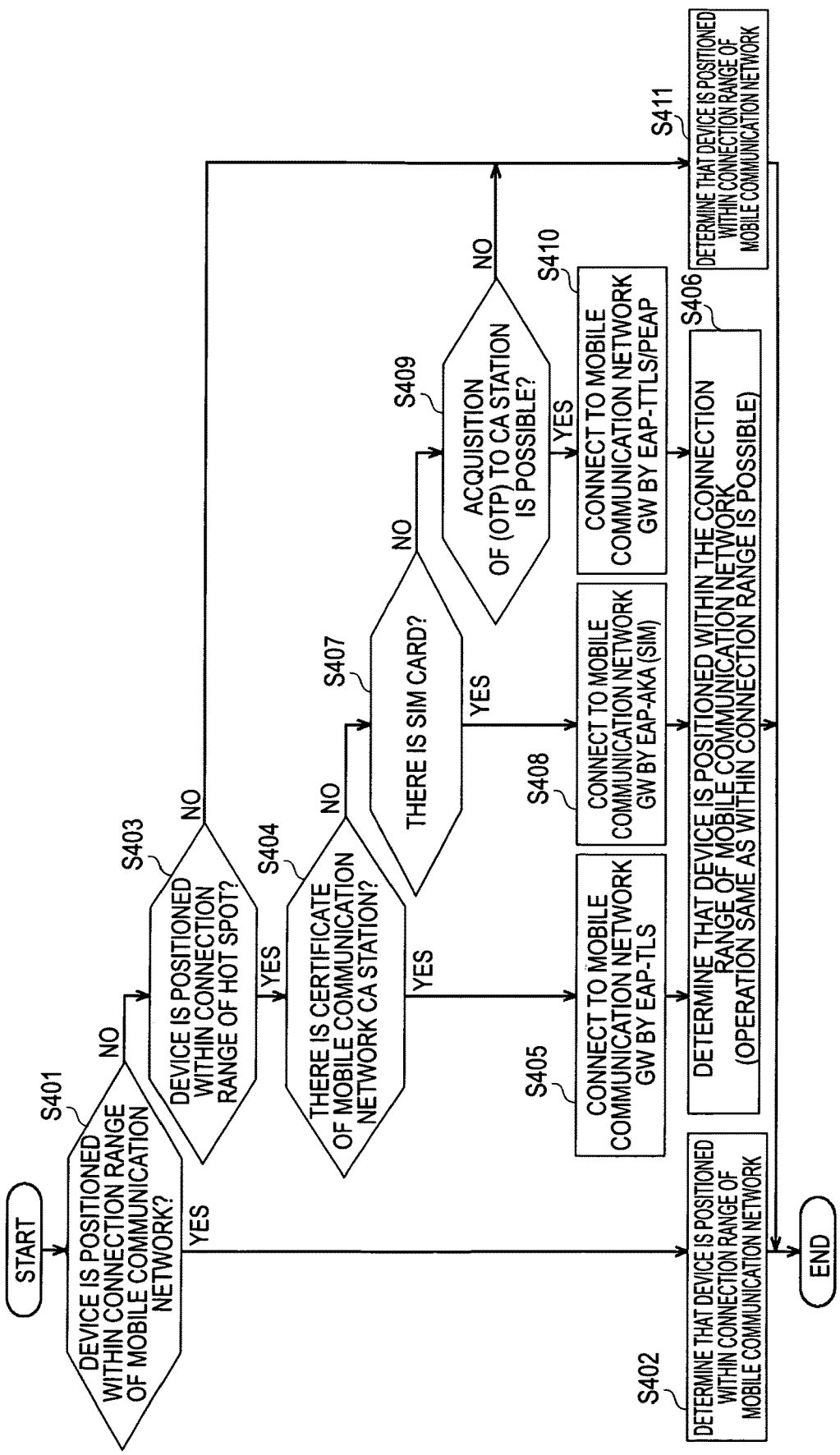
FIG. 27 is a flowchart for explaining an example of the processing flow of mobile communication network connection.

An example of the flow of processing for confirming the connection by the wireless communication device 101 with respect to the mobile communication network will be explained with reference to a flowchart of FIG. 27. The confirming processing is performed when the wireless communication device 101 has no reception or not, for example, in the distribution method selection processing explained with reference to the flowcharts of FIG. 11 and FIG. 12.

The distribution method selection unit 314 determines whether the wireless communication device 101 is positioned within a connection range of the mobile communication network or not in Step S401. When it is determined that the device is positioned in the range, the process proceeds to Step S402 and the distribution method selection unit 314 determines that the device is positioned in the connection range of the mobile communication network.

When it is determined that the wireless communication device 101 is not positioned in the connection range of the mobile communication network in Step S401, the process proceeds to Step S403. In Step S403, the distribution method selection unit 314 determines whether the wireless communication device 101 is positioned within a connection range of the hot spot or not. When it is determined that the device is positioned within the range, the process proceeds to Step S404.

In Step S404, the distribution method selection unit 314 determines whether a certificate of a mobile communication network CA station is included or not. When it is determined that there is the certificate, the process proceeds to Step S405, and the distribution method selection unit 314 connects to the mobile communication network gateway (GW) by EAP-TLS. When the connection is completed, the distribution method selection unit 314 determines that the device is positioned within the connection range of the mobile communication network in Step S406.

In Step S404, it is determined that there is the certificate, the process proceeds to Step S407, and the distribution method selection unit 314 determines whether there exists the SIM card or not. When it is determined that there is the SIM card, the process proceeds to Step S408, where the distribution method selection unit 314 connects to the mobile communication network gateway (GW) by EAP-AKA (SIM). After the connection is completed, the distribution method selection unit 314 returns to Step S406 and determines that the device is positioned within the connection range of the mobile communication network.

When it is determined that there is not the SIM card in Step S407, the process proceeds to Step S409 and the distribution method selection unit 314 determines whether acquisition of the one-time password (OTP) with respect to the CA station is possible or not. When it is determined that the one-time password can be acquired, the process proceeds to Step S410, where the distribution method selection unit 314 connects to the mobile communication network gateway (GW) by EAP-TTLS/PEAP. When the connection is completed, the distribution method selection unit 314 returns to Step S406 and determines that the device is positioned within the connection range of the mobile communication network.

In Step S409, it is determined that it is difficult to acquire the one-time password, the process proceeds to Step S411, where the distribution method selection unit 314 determines that the device is positioned out of the communication range of mobile communication network.

When it is determined that the device is not positioned within the connection range of the hot spot in Step S403, the process proceeds to Step S411, and the distribution method selection unit 314 determines that the device is out of the range of the mobile communication network.

According to the connection confirmation as described above, the distribution method selection unit 314 can regard not only the state in which the device can connect to the mobile communication network directly but also the state in which the device can connects to the mobile communication network by any of methods in FIG. 26 through other communication networks as shown in FIG. 25.

Accordingly, the content distribution system 100 can increase legitimate distribution opportunity of contents under more various conditions.

In the above description, the case in which the selection of the content distribution method is made by the supply-side wireless communication device 101A and the acquisition-side wireless communication device 101B has been explained, however, it is not limited to this and the selection may be made by other devices. In that case, it is necessary that other devices which select the content distribution method acquire necessary information from the supply-side wireless communication device 101A and the acquisition-side wireless communication device 101B and notify them of the selection result.

The above series of processing can be executed by hardware as well as software. In the case that the above series of processing is executed by software, programs included in the software are installed from networks or storage media.

The storage media includes not only removal media, for example, as shown in FIGS. 2 to 5, such as a magnetic disc (including a flexible disc), an optical disc (including a CD-ROM (Compact Disc-Read Only Memory), DVD (Digital Versatile Disc)), a magneto-optic disc (including a MD (Mini Disc)) or a semiconductor memory, which are distributed for delivering programs to the user and store programs, provided separately from the device itself, but also the ROM which stores programs, a hard disk included in the storage unit and so on, which are delivered to the user in a state of previously being integrated into the device itself.

Programs executed by the computer may be programs processed in time series along the order explained in the specification as well as may be programs processed in parallel or at necessary timing, for example, when calling is performed.

In the specification, steps in which programs to be recorded in the recording media are described include processing performed in time series along the described order as well as processing executed in parallel or individually, not always processed in time series.

In the specification, the system indicates the whole apparatus including plural devices (apparatus).

In the above description, it is also preferable that the configuration explained as one device (or one processing unit) is divided into plural devices (or processing units). Conversely, it is preferable that, configurations explained as plural devices (or processing units) in the above description may be integrated into one device (one processing unit). Additionally, configurations other than the above may be added to the respective devices (or respective processing units). Furthermore, part of the configuration of a certain device (or a processing unit) may be included in the configuration of another device (or another processing unit) as long as the configuration and operation as the whole system are substantially the same. That is, the embodiment of the invention is not limited to the above embodiments and can be variously modified within a range not departing from the gist of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
a first information processing device, comprising:
a memory for storing instructions; and
a Central Processing Unit (CPU) configured to execute the instructions comprising:
establishing a communication between the first information processing device and a second information processing device which is within a specific distance from the first information processing device;
exchanging, between the first information processing device and the second information processing device based on the established communication, messages that include information related to a near field wireless communication and a content list that includes a plurality of contents;
establishing the near field wireless communication between the first information processing device and the second information processing device based on the information related to the near field wireless communication included in the messages;
acquiring selected content instruction information from the second information processing device via the near field wireless communication, wherein the selected content instruction information indicates a first set of contents selected from the plurality of contents by a user;
classifying the plurality of contents into the first set of contents and remaining contents;
extracting, from the remaining contents, a second set of contents in which a payment process is not necessary before transmitting the second set of contents;
determining the first information processing device is one of capable to connect to a server or incapable to connect to the server;
determining the second information processing device is one of capable to connect to the server or incapable to connect to the server;
transmitting the second set of contents from the first information processing device to the second information processing device, based on:
the payment process that is not necessary before transmitting the second set of contents,
the determination the first information processing device is capable to connect to the server, and
the determination the second information processing device is capable to connect to the server;
receiving a certificate and a public key from the second information processing device, based on:
the payment process that is necessary before transmitting the first set of contents,
the determination the second information processing device is capable to connect to the server, and
the determination the first information processing device is incapable to connect to the server;
determining an authenticity of the certificate received from the second information processing device;
encrypting the first set of contents based on the public key;
packaging the encrypted first set of contents;
encrypting the packaged first set of contents based on the public key;
transmitting the encrypted first set of contents from the first information processing device to the second information processing device;
generating an encryption key based on:
the payment process that is not necessary before transmitting the first set of contents,
the determination the first information processing device is capable to connect to the server, and
the determination the second information processing device is capable to connect to the server;
encrypting, based on the generated encryption key, the first set of contents and the second set of contents before the payment process;
transmitting as a single package, before the payment process, the encrypted first set of contents and the encrypted second set of contents from the first information processing device to the second information processing device; and registering the generated encryption key in the server, wherein decryption of the encrypted first set of contents and the encrypted second set of contents is based on the registered encryption key in the server.

2. The information processing system according to claim 1, wherein the decryption of the encrypted first set of contents is based on a secret key corresponding to the public key.

3. An information processing method, the method comprising:
in a first information processing device that includes a Central Processing Unit (CPU):
establishing, by the CPU, a communication with a second information processing device which is within a specific distance from the first information processing device;
exchanging, by the CPU, messages with the second information processing device based on the established communication, wherein the messages include information related to a near field wireless communication and
a content list that includes a plurality of contents;
establishing, by the CPU, the near field wireless communication with the second information processing device based on the information related to the near field wireless communication included in the messages;
acquiring, by the CPU, selected content instruction information from the second information processing device via the near field wireless communication, wherein the selected content instruction information indicates a first set of contents selected from the plurality of contents by a user;
classifying, by the CPU, the plurality of contents into the first set of contents and remaining contents;
extracting, by the CPU, a second set of contents from the remaining contents, wherein a payment process is not necessary before transmitting the second set of contents;
determining, by the CPU, the first information processing device is one of capable to connect to a server or incapable to connect to the server;
determining, by the CPU, the second information processing device is one of capable to connect to the server or incapable to connect to the server;
transmitting, by the CPU, the second set of contents from the first information processing device to the second information processing device, based on:
the payment process that is not necessary before transmitting the second set of contents,
the determination the first information processing device is capable to connect to the server, and
the determination the second information processing device is capable to connect to the server;
receiving, by the CPU, a certificate and a public key from the second information processing device, based on:
the payment process that is necessary before transmitting the first set of contents,
the determination the second information processing device is capable to connect to the server, and
the determination the first information processing device is incapable to connect to the server;
determining, by the CPU, an authenticity of the certificate received from the second information processing device;
encrypting, by the CPU, the first set of contents based on the public key;
packaging, by the CPU, the encrypted first set of contents;
encrypting, by the CPU, the packaged first set of contents based on the public key;
transmitting, by the CPU, the encrypted first set of contents from the first information processing device to the second information processing device;
generating, by the CPU, an encryption key based on:
the payment process that is not necessary before transmitting the first set of contents,
the determination the first information processing device is capable to connect to the server, and
the determination the second information processing device is capable to connect to the server;
encrypting, by the CPU, the first set of contents and the second set of contents before the payment process, based on the generated encryption key;
transmitting, by the CPU, before the payment process, the encrypted first set of contents and the encrypted second set of contents from the first information processing device to the second information processing device, wherein the encrypted first set of contents and the encrypted second set of contents are transmitted as a single package; and
registering, by the CPU, the generated encryption key in the server, wherein decryption of the encrypted first set of contents and the encrypted second set of contents is based on the registered encryption key in the server.

4. An information processing method, comprising:
in an information processing system that comprises a first information processing device configured to transmit content data, a second information processing device configured to receive the content data, and a server configured to manage transmission of the content data from the first information processing device to the second information processing device:
establishing, by a Central Processing Unit (CPU) of the first information processing device, a communication with the second information processing device which is within a specific distance from the first information processing device;
exchanging messages, by the CPU of the first information processing device, with the second information processing device based on the established communication, wherein the messages include information related to a near field wireless communication and a content list that includes a plurality of contents;
establishing, by the CPU of the first information processing device, the near field wireless communication with the second information processing device based on the information related to the near field wireless communication included in the messages;
acquiring, by the CPU of the first information processing device, selected content instruction information from the second information processing device via the near field wireless communication, wherein the selected content instruction information indicates a first set of contents selected from the plurality of contents by a user;
classifying, by the CPU of the first information processing device, the plurality of contents into the first set of contents and remaining contents;
extracting, by the CPU of the first information processing device, a second set of contents from the remaining contents, wherein a payment process is not necessary before transmitting the second set of contents;
determining, by the CPU of the first information processing device, the first information processing device is one of capable to connect to the server or incapable to connect to the server;

determining, by the CPU of the first information processing device, the second information processing device is one of capable to connect to the server or incapable to connect to the server;

transmitting, by the CPU of the first information processing device, the second set of contents from the first information processing device to the second information processing device, based on:
- the payment process that is not necessary before transmitting the second set of contents,
- the determination the first information processing device is capable to connect to the server, and
- the determination the second information processing device is capable to connect to the server;

receiving, by the CPU of the first information processing device, a certificate and a public key from the second information processing device, based on:
- the payment process that is necessary before transmitting the first set of contents,
- the determination the second information processing device is capable to connect to the server, and
- the determination the first information processing device is incapable to connect to the server;

determining, by the CPU of the first information processing device, an authenticity of the certificate received from the second information processing device;

encrypting, by the CPU of the first information processing device, the first set of contents based on the public key;

packaging, by the CPU of the first information processing device, the encrypted first set of contents;

encrypting, by the CPU of the first information processing device, the packaged first set of contents based on the public key;

transmitting, by the CPU of the first information processing device, the encrypted first set of contents from the first information processing device to the second information processing device;

receiving, by a CPU of the second information processing device, the content data from the first information processing device, wherein the content data corresponds to at least one of the second set of contents or the encrypted first set of contents;

generating, by the CPU of the first information processing device, an encryption key based on:
- the payment process that is not necessary before transmitting the first set of contents,
- the determination the first information processing device is capable to connect to the server, and
- the determination the second information processing device is capable to connect to the server;

encrypting, by the CPU of the first information processing device, the first set of contents and the second set of contents before the payment process, based on the generated encryption key;

transmitting, by the CPU of the first information processing device, before the payment process, the encrypted first set of contents and the encrypted second set of contents from the first information processing device to the second information processing device, wherein the encrypted first set of contents and the encrypted second set of contents are transmitted as a single package; and registering, by the CPU of the first information processing device, the generated encryption key in the server, wherein decryption of the encrypted first set of contents and the encrypted second set of contents is based on the registered encryption key in the server.

* * * * *